US011964664B2

(12) United States Patent
Ito et al.

(10) Patent No.: US 11,964,664 B2
(45) Date of Patent: Apr. 23, 2024

(54) DRIVING ASSISTANCE METHOD, DRIVING ASSISTANCE SYSTEM, AND SERVER

(71) Applicant: LOGISTEED, Ltd., Tokyo (JP)

(72) Inventors: Nao Ito, Tokyo (JP); Takeshi Tanaka, Tokyo (JP); Shunsuke Minusa, Tokyo (JP); Hiroyuki Kuriyama, Tokyo (JP); Kiminori Satoh, Tokyo (JP)

(73) Assignee: Logisteed, Ltd., Tokyo (JP)

( * ) Notice: Subject to any disclaimer, the term of this patent is extended or adjusted under 35 U.S.C. 154(b) by 8 days.

(21) Appl. No.: 18/087,084

(22) Filed: Dec. 22, 2022

(65) Prior Publication Data
US 2023/0303086 A1 Sep. 28, 2023

(30) Foreign Application Priority Data
Mar. 25, 2022 (JP) .................................. 2022-049414

(51) Int. Cl.
G08B 23/00 (2006.01)
B60W 40/02 (2006.01)
B60W 40/08 (2012.01)
B60W 50/00 (2006.01)
B60W 50/14 (2020.01)

(52) U.S. Cl.
CPC ............ B60W 40/08 (2013.01); B60W 40/02 (2013.01); B60W 50/0097 (2013.01); B60W 50/14 (2013.01); B60W 2050/143 (2013.01); B60W 2050/146 (2013.01); B60W 2540/221 (2020.02)

(58) Field of Classification Search
CPC .. B60W 40/08; B60W 40/02; B60W 50/0097; B60W 50/14; B60W 2540/221; B60W 2050/143; B60W 2050/146

USPC .......................................................... 340/576
See application file for complete search history.

(56) References Cited

U.S. PATENT DOCUMENTS

| 2008/0174451 A1* | 7/2008 | Harrington | ............ G08B 21/06 |
| | | | 340/905 |
| 2020/0057487 A1* | 2/2020 | Sicconi | .................. G06T 7/254 |
| 2021/0213960 A1* | 7/2021 | Dingli | ................... B60W 40/09 |
| 2022/0126864 A1* | 4/2022 | Moustafa | ............ B60W 30/182 |
| 2022/0392010 A1* | 12/2022 | Ishiguro | ................ G06Q 50/40 |

FOREIGN PATENT DOCUMENTS

| JP | 2021-037033 A | 3/2021 |
| JP | 2021-196625 A | 12/2021 |

\* cited by examiner

Primary Examiner — Naomi J Small
(74) Attorney, Agent, or Firm — Volpe Koenig

(57) ABSTRACT

A driving assistance method of assisting driving of a vehicle, includes, by a computer, acquiring biological information of a driver who is driving the vehicle, acquiring environment information of the driver, acquiring operation information of the driver, generating biological index data from the biological information, generating integrated information by aligning and combining time series of the biological index data, the environment information, and the operation information, calculating accident risk information after a predetermined time, by inputting the integrated information to an accident risk prediction model set in advance, and calculating factor information of the accident risk information by inputting the accident risk information, the integrated information, and accident risk judge information set in advance to a factor calculation model set in advance.

15 Claims, 22 Drawing Sheets

FIG. 3

| USER ID ~411 | DATE AND TIME ~412 | HEARTBEAT INTERVAL DATA ~413 | BLOOD PRESSURE ~414 | BODY TEMPERATURE ~415 | ... | MEDICAL INQUIRY RESULT ~416 |
|---|---|---|---|---|---|---|
| 000000001 | 2021/12/1 7:00:00.000 | NOT MEASURED | 12.5 | 36.5 | ... | FAVORABLE |
| 000000001 | 2021/12/1 7:15:00.000 | 790 | NOT MEASURED | NOT MEASURED | ... | NOT MEASURED |
| 000000001 | 2021/12/1 7:15:00.790 | 800 | NOT MEASURED | NOT MEASURED | ... | NOT MEASURED |
| ... | ... | ... | ... | ... | ... | ... |

| AREA ID | DATE | DAY OF WEEK | TIME SECTION | WEATHER | AIR TEMPERATURE | ... | ATMOSPHERIC PRESSURE |
|---|---|---|---|---|---|---|---|
| A0001 | 2021/12/1 | WEDNESDAY | 00:00–11:59 | CLOUDY | 9 | ... | 1021.4 |
| A0001 | 2021/12/1 | WEDNESDAY | 12:00–23:59 | SUNNY | 12 | ... | 1020.6 |
| ... | | | | | | ... | |

FIG. 5

| USER ID /4311 | CLOCK-IN DATE AND TIME /4312 | PREVIOUS CLOCK-OUT DATE AND TIME /4313 | NUMBER OF CONSECUTIVE CLOCK-IN DAYS /4314 | BREAK TIME /4315 | ... |
|---|---|---|---|---|---|
| 000000001 | 2021/12/1 7:00 | 2021/11/30 22:00 | 3 | 1.3 | ... |
| 000000001 | 2021/12/2 9:00 | 2021/12/1 20:00 | 4 | 2.0 | ... |
| ... | ... | ... | ... | ... | ... |

| USER ID 4321 | DATE AND TIME 4322 | AREA ID 4323 | CARRIED OBJECT 4324 | DELIVERY ROUTE 4325 | DELAYED-OR-NOT 4326 | ... |
|---|---|---|---|---|---|---|
| 000000001 | 2021/12/1 7:00 | A0001 | MACHINE | TOKYO-NAGANO | NO | ... |
| 000000001 | 2021/12/1 15:00 | A0001 | STONE MATERIAL | NAGANO-TOKYO | YES | ... |
| ... | ... | ... | ... | ... | ... | ... |

| USER ID | DATE AND TIME | ANF INFORMATION (AUTONOMIC NERVE LF/HF) | BODY TEMPERATURE | AIR TEMPERATURE | NUMBER OF CONSECUTIVE CLOCK-IN DAYS | DELAY | TRAVELING STATE | ... |
|---|---|---|---|---|---|---|---|---|
| 000000001 | 2021/12/1 7:15 | 12.5 | 36.5 | 9.0 | 3 | NO | EXPRESSWAY | ... |
| 000000001 | 2021/12/1 7:17 | 18.2 | 36.5 | 9.0 | 3 | NO | EXPRESSWAY | ... |
| 000000001 | 2021/12/1 7:19 | 17.3 | 36.5 | 9.0 | 3 | NO | GENERAL ROAD (TRAFFIC JAM) | ... |
| ... | ... | ... | ... | ... | ... | ... | ... | ... |

FIG. 14

| USER ID /521 | DETECTION DATE AND TIME /522 | VEHICLE SPEED /523 | ACCELERATION /524 | INTER-VEHICLE DISTANCE /525 | CAMERA INFORMATION /526 | ... | INCIDENT PRESENCE OR ABSENCE /527 | INCIDENT FACTOR /528 |
|---|---|---|---|---|---|---|---|---|
| 000000001 | 2021/12/1 7:15:30 | S1 | A1 | D1 | C1 | ... | 1 (=YES) | SIDE GLANCE |
| 000000002 | 2021/12/2 8:00 | S2 | A2 | D2 | C2 | ... | 0 (=NO) | - |
| ... | ... | ... | ... | ... | ... | ... | ... | ... |

FIG. 16

| USER ID /451 | MEASUREMENT TIME POINT /452 | TIME-SERIES BIOLOGICAL-ENVIRONMENT-OPERATION INFORMATION /453 | PREDICTION TARGET TIME SECTION /454 | INCIDENT OCCURRENCE PROBABILITY /455 |
|---|---|---|---|---|
| 000000001 | 2021/12/1 7:45 | (OMITTED) | 2021/12/1 7:45–2021/12/1 8:15 | 80% |
| 000000002 | ⋮ | ⋮ | ⋮ | ⋮ |
| ⋮ | ⋮ | ⋮ | ⋮ | ⋮ |

| USER ID | ACCIDENT RISK | FIRST ACCIDENT RISK FACTOR | SECOND ACCIDENT RISK FACTOR | ... | FACTOR LABEL |
|---|---|---|---|---|---|
| 00000001 | (OMITTED) | NUMBER OF CONSECUTIVE CLOCK-IN DAYS > 6 | WEATHER = "RAINY" | ... | NONE |
| ... | ... | ... | ... | ... | ... |
| ... | ... | ... | ... | ... | ... |

DRIVING ASSISTANCE METHOD, DRIVING ASSISTANCE SYSTEM, AND SERVER

CLAIM OF PRIORITY

The present application claims priority from Japanese patent application JP 2022-049414 filed on Mar. 25, 2022, the content of which is hereby incorporated by reference into this application.

CROSS-REFERENCE TO RELATED APPLICATIONS

The present invention claims priority under 35 U.S.C. § 119 to Japanese Patent Application No. 2022-049414 filed on Mar. 25, 2022, the entire content of which is incorporated herein by reference.

BACKGROUND OF THE INVENTION

1. Field of the Invention

The present invention relates to a driving assistance method, a driving assistance system, and a server that predict a risk of a traffic accident and assist driving of transportation.

2. Description of the Related Art

In recent years, quantitative evaluation of a biological state has been performed in order to prevent an occurrence of an accident caused by health of a driver in a transportation operation such as a truck or a bus. For example, in JP 2021-37033 A, evaluation of an autonomic nervous function based on measurement of heartbeat interval data by heart rate sensors of various forms that easily perform measurement among biological states has been known.

JP 2021-37033 A discloses estimation of a psychological state of a driver from biological data or the like, generation of psychological data regarding driving of the driver, and estimation of suitability and unsuitability of the state of the driver.

JP 2021-196625 A discloses estimation of an autonomic nervous function index of a driver from heartbeat interval data of biological data and prediction of an accident risk after a predetermined time based on the autonomic nervous function index.

SUMMARY OF THE INVENTION

In order to predict the risk of an accident of a driver on operation, it is necessary to predict an accident risk in the near future in real time. The biological state of the driver on operation changes sequentially, and the factors of the accident risk include environment information, operation information (business information), and the like in addition to biological information. The environment information such as a traveling state and the operation information such as the work contents are different for each driver.

However, in the conventional example, there is a problem that it is difficult to predict the accident risk of each individual driver with high accuracy by accurately reflecting the environment information and the operation information to the biological information. In addition, in the conventional example, a warning is output when the accident risk increases, but it is not possible to obtain the understanding of the driver only by simply presenting the warning.

Therefore, the present invention has been made in view of the above problems, and an object of the present invention is to predict an accident risk with high accuracy and to present information that can be understood by a driver.

According to the present invention, there is provided a driving assistance method in which a computer including a processor and a memory assists driving of a vehicle. The driving assistance method includes, by the computer, acquiring biological information of a driver who is driving the vehicle, acquiring environment information of the driver, acquiring operation information of the driver, generating biological index data from the biological information, generating integrated information by aligning and combining time series of the biological index data, the environment information, and the operation information, calculating accident risk information after a predetermined time, by inputting the integrated information to an accident risk prediction model set in advance, and calculating factor information of the accident risk information by inputting the accident risk information, the integrated information, and accident risk judge information set in advance to a factor calculation model set in advance.

Thus, according to the present invention, it is possible to present information that does not make the driver feel uncomfortable, by not only predicting accident risk information after a predetermined time, but also outputting factor information of an accident risk.

Details of at least one embodiment of the subject matter disclosed herein are set forth in the accompanying drawings and the following description. Other features, aspects, and effects of the disclosed subject matter will be apparent from the following disclosure, drawings, and claims.

BRIEF DESCRIPTION OF THE DRAWINGS

FIG. 3 is a diagram illustrating the embodiment of the present invention and illustrating an example of biological information;

FIG. 4 is a diagram illustrating the embodiment of the present invention and illustrating an example of environment information;

FIG. 5 is a diagram illustrating the embodiment of the present invention and illustrating an example of attendance data forming operation information;

FIG. 6 is a diagram illustrating the embodiment of the present invention and illustrating an example of delivery data forming the operation information;

FIG. 12 is a diagram illustrating the embodiment of the present invention and illustrating an example of time-series biological-environment-operation information;

FIG. 14 is a diagram illustrating the embodiment of the present invention and illustrating an example of accident risk judge information;

FIG. 16 is a diagram illustrating the embodiment of the present invention and illustrating an example of accident risk information;

FIG. 18 is a diagram illustrating the embodiment of the present invention and illustrating an example of accident risk factor information;

DESCRIPTION OF THE PREFERRED EMBODIMENTS

Hereinafter, embodiments of the present invention will be described with reference to the drawings.

System Configuration

Figure 1:
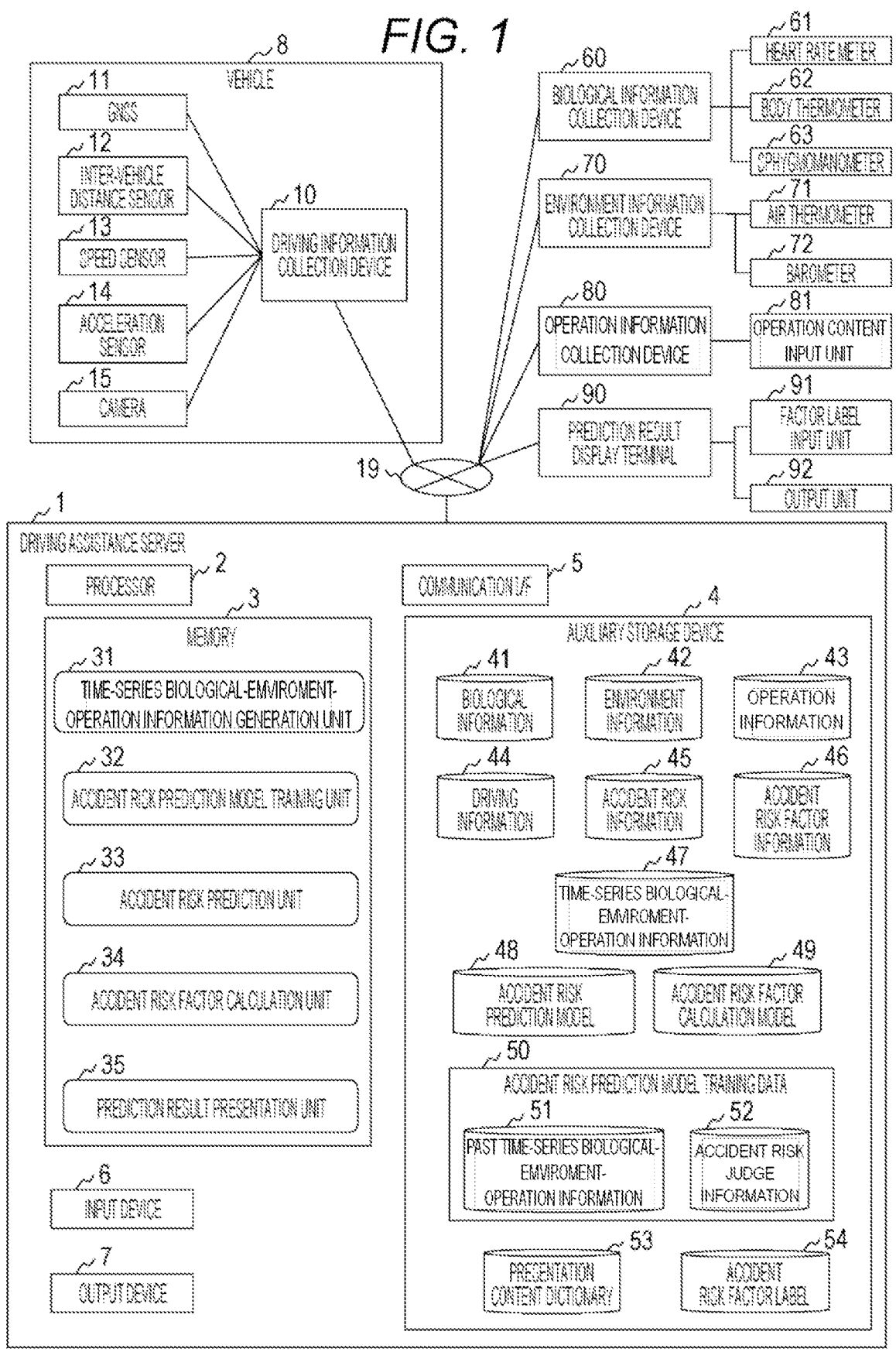
FIG. 1 is a block diagram illustrating an embodiment of the present invention and illustrating an example of a configuration of a driving assistance system.

FIG. 1 is a block diagram illustrating an embodiment of the present invention and illustrating an example of a configuration of a driving assistance system. According to the present embodiment, a driving assistance system includes a driving assistance server 1. The driving assistance server 1 collects driving information of one or more vehicles 8, biological information of a driver of the vehicle 8, environment information of the vehicle 8 or the driver, and operation information of the driver via a network 19, and predicts a risk of a traffic accident of the driver (referred to as an accident risk below). When a prediction value of an accident risk exceeds a threshold value, the driving assistance server 1 notifies the driver. Note that the operation information can include business information, transportation information, delivering information, and the like.

A driving information collection device 10 that acquires the driving information of the vehicle 8, a biological information collection device 60 that acquires the biological information of the driver, an environment information collection device 70 that acquires information regarding an environment of the driver who drives the vehicle 8, an operation information collection device 80 that acquires information regarding operation of the driver, and a prediction result display terminal 90 that outputs a notification from the driving assistance server 1 are connected to the network 19 and can communicate with the driving assistance server 1.

The driving information collection device 10 collects types of information from a global navigation satellite system (GNSS) 11 that detects position information of the vehicle 8, an inter-vehicle distance sensor 12 that detects a distance from a preceding vehicle, a speed sensor 13 that detects a speed of the vehicle 8, an acceleration sensor 14 that detects a movement of the vehicle 8, and a camera 15 that picks up an image of the surroundings of the vehicle 8. The driving information collection device 10 transmits the collected types of information to the driving assistance server 1.

The driving information collection device 10 is not limited to the above sensors, and a distance measurement sensor that detects an object and a distance around the vehicle 8, a steering angle sensor that detects a driving operation, or the like can be used. In addition, the driving information collection device 10 can be provided with a driver ID reading device (not illustrated) that reads a medium recording the identifier of the driver in order to identify the driver.

The biological information collection device 60 includes sensors, that is, a heart rate meter 61 that detects heart rate data, a body thermometer 62 that detects the body temperature of the driver, and a sphygmomanometer 63 that detects the blood pressure of the driver. As the biological information collection device 60, a sensing device attached to the inside of the vehicle 8, such as a steering wheel, a seat, or a seat belt, an image recognition system that picks up an image of the expression or behavior of the driver and analyzes the image, or the like can be used in addition to a wearable device that can be worn by the driver.

The sensors of the biological information collection device 60 are not limited to the above description, and a sensor that detects the amount of perspiration, body temperature, blinking, eye movement, brain waves, or the like can be adopted. In addition, the biological information collection device 60 can set an identifier for identifying the driver and add the identifier to various types of sensing data.

The environment information collection device 70 includes an air thermometer 71 and a barometer 72. The environment information collection device 70 may be attached to the vehicle 8 or may be worn by the driver similarly to the biological information collection device 60.

The operation information collection device 80 includes an operation content input unit 81 provided for inputting the operation content of the driver. The driver can input, from the operation content input unit 81, information such as the type of operation, the start and end of operation, a break, and the content of delivery operation. The operation information collection device 80 may be mounted on the vehicle 8, may be a portable terminal possessed by a driver, or may be a terminal that is installed in an office or the like and can be remotely operated.

The prediction result display terminal 90 includes a factor label input unit 91 and an output unit 92. The factor label input unit 91 receives a factor label selected or input by the driver as to a factor that has caused the warning of an accident risk, and transmits the factor label to the driving assistance server 1. The output unit 92 includes a display device or a speaker, and outputs a warning of an accident risk or a notice of calling attention, which has been transmitted from the driving assistance server 1. The factor label input unit 91 can receive an input of a voice in addition to text data.

The prediction result display terminal 90 may be a portable terminal possessed by the driver, a car navigation device mounted on the vehicle 8, or a computer installed in an office or the like.

The driving assistance server 1 is a computer including a processor 2, a memory 3, an auxiliary storage device 4, a communication interface 5, an input device 6, and an output device 7. The memory 3 loads, as programs, the respective functional units of a time-series biological-environment-operation information generation unit (or integrated information generation unit) 31, an accident risk prediction model training unit 32, an accident risk prediction unit 33, an accident risk factor calculation unit 34, and a prediction result presentation unit 35. Each of the programs is executed by the processor 2. Details of each functional unit will be described later.

The processor 2 executes processing in accordance with a program of each functional unit to run as the functional unit that provides a predetermined function. For example, the processor 2 executes an accident risk prediction program to function as the accident risk prediction unit 33. The same applies to other programs. Further, the processor 2 also runs as a functional unit that provides each function in a plurality of pieces of processing executed by the respective programs. The computer and a computer system are a device and a system including such functional units.

The auxiliary storage device (storage device) 4 stores data used by each functional unit described above. The auxiliary storage device 4 stores biological information 41, environment information 42, operation information 43, driving information 44, accident risk information 45, accident risk factor information 46, time-series biological-environment-operation information 47, an accident risk prediction model 48, an accident risk factor calculation model 49, accident risk prediction model training data 50, a presentation content dictionary 53, and an accident risk factor label 54.

The accident risk prediction model training data 50 includes past time-series biological-environment-operation information 51 and past accident risk judge information 52. Details of the data will be described later.

The input device 6 includes a mouse, a keyboard, a touch panel, or the like. The output device 7 includes a display, a speaker, and the like. The communication interface 5 is connected to the network 19 and communicates with the vehicle 8, the biological information collection device 60, the environment information collection device 70, the operation information collection device 80, and the prediction result display terminal 90.

Software Configuration

The time-series biological-environment-operation information generation unit 31 acquires driving information from the vehicle 8 and stores the acquired driving information, acquires biological information from the biological information collection device 60 and stores the acquired biological information as the biological information 41 in the auxiliary storage device 4, acquires environment information from the environment information collection device 70 and stores the acquired environment information as the environment information 42 in the auxiliary storage device 4, and acquires operation information from the operation information collection device 80 and stores the acquired operation information as the operation information 43 in the auxiliary storage device 4.

The time-series biological-environment-operation information generation unit 31 calculates an R wave interval (RRI=R-R Interval) of the heart rate data from data (referred to as heart rate data below) of the heart rate meter 61 in the biological information 41, and calculates an autonomic nervous function (ANF) index from the RRI data (or the heartbeat interval data). Then, the time-series biological-environment-operation information generation unit 31 stores the calculated R wave interval and the calculated index as the biological information 41 in the auxiliary storage device 4.

Furthermore, as will be described later, the time-series biological-environment-operation information generation unit 31 combines the granularity (measurement interval) of the biological information 41, the granularity (measurement interval) of the environment information 42, the granularity (collection interval) of the operation information 43, and the granularity (measurement interval) of the driving information 44 with the granularity (calculation interval or analysis window width) of the autonomic nervous function index to generate the time-series biological-environment-operation information 47.

The accident risk prediction model training unit 32 performs learning of the accident risk prediction model 48 being a machine learning model by using the accident risk prediction model training data 50 collected in advance, and generates or updates the accident risk prediction model 48.

Using the learned accident risk prediction model 48, the accident risk prediction unit 33 receives, as an input, the time-series biological-environment-operation information 47 collected from the vehicle 8 and the driver, and outputs accident risk information 45 indicating an accident occurrence probability of the driver after a predetermined time.

Using the accident risk factor calculation model 49 of a preset machine learning model, the accident risk factor calculation unit 34 receives, as an input, the time-series biological-environment-operation information 47 and the accident risk information 45, and calculates a highly relevant factor as the accident risk factor information 46.

When the calculated accident risk information 45 satisfies a predetermined condition (when the accident occurrence probability exceeds a preset threshold value Th1), the prediction result presentation unit 35 acquires the accident risk factor information 46 corresponding to the accident risk information 45, and acquires a message (or warning) corresponding to the accident risk factor information 46 from the presentation content dictionary 53 set in advance. Then, the prediction result presentation unit 35 transmits the message to the prediction result display terminal 90.

As will be described later, the prediction result presentation unit 35 receives a label input by the driver with the factor label input unit 91 in response to the transmitted warning, and stores the received label in the accident risk factor label 54.

In the present embodiment, a case where the biological information measured from the driver of the vehicle 8 is targeted is exemplified, but the target is not limited to the driver who operates the vehicle 8. For example, a person who operates a moving object such as an airplane or a train may be targeted.

Outline of Processing

Figure 2:
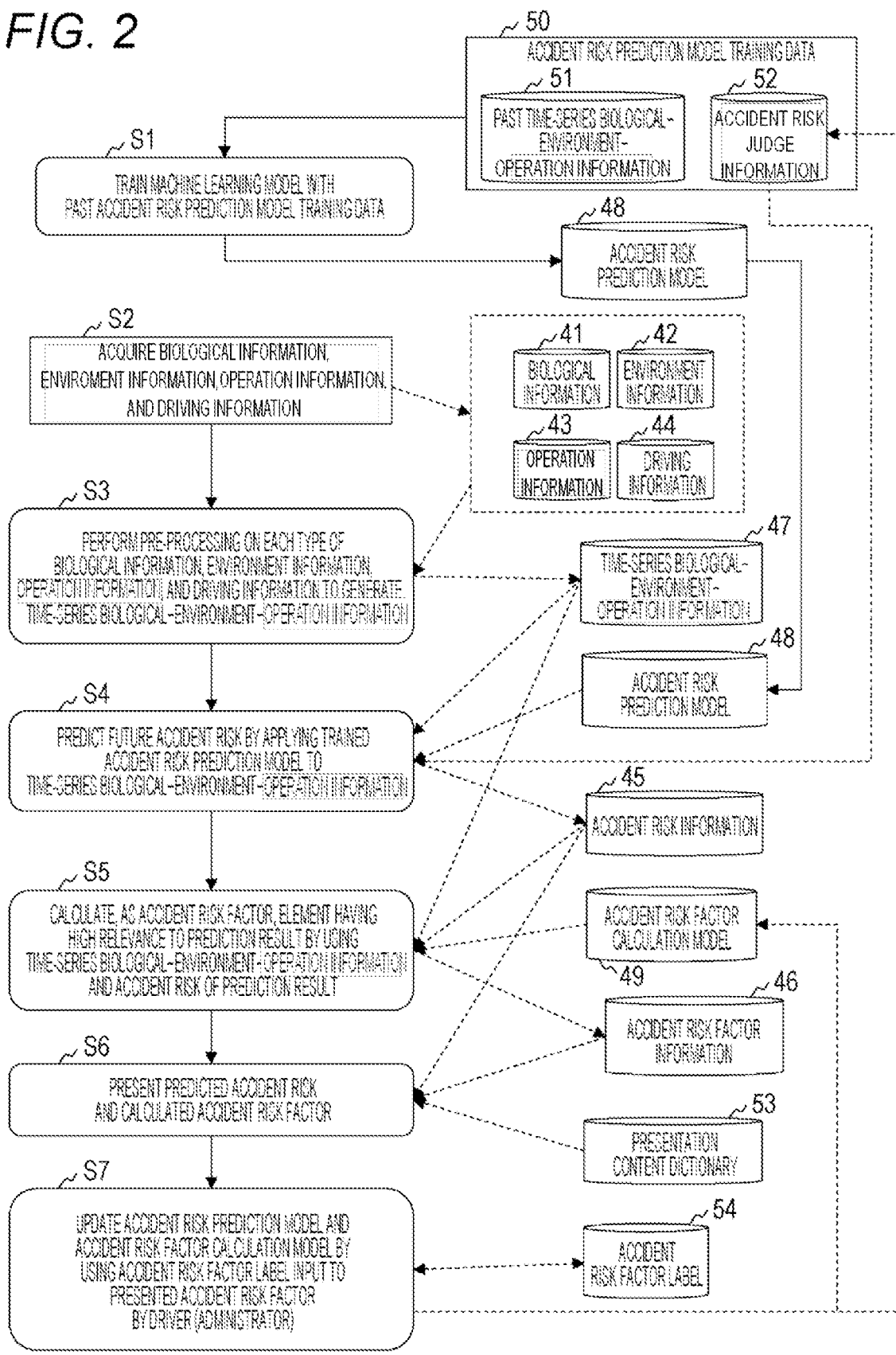
FIG. 2 is a flowchart illustrating the embodiment of the present invention and illustrating an outline of processing performed by the driving assistance system.

FIG. 2 is a flowchart illustrating an outline of processing performed by the driving assistance system. First, the accident risk prediction model training unit 32 trains and updates an accident risk prediction model 48 by using accident risk prediction model training data 50 set in advance.

In the driving assistance system in the present embodiment, a machine learning model for estimating an accident risk from past driving information and past biological information is generated in advance as the accident risk prediction model 48, and the machine learning model is trained in a manner that the accident risk prediction model is learned by inputting the accident risk prediction model training data 50 to the accident risk prediction model 48 (S1).

Generation or training of the accident risk prediction model 48 may be performed in a similar manner to that in JP 2021-196625 A. For example, a definition model for estimating an accident risk from a traveling state of the vehicle 8 is generated by using past traveling data and past risk occurrence data as an input. Then, a probability of an occurrence of the accident risk is generated as accident risk estimation data, by inputting the traveling data collected in the past to the definition model. Then, the machine learning model of calculating biological index data of the driver from the past biological information, receiving, as an input, the accident risk estimation data and the biological index data, and outputting an accident risk (probability) after a predetermined time based on the biological index data of the traveling vehicle 8 can be generated as the accident risk prediction model.

As the biological index data in the present embodiment, for example, power spectral density (to be described later) calculated from the heart rate data of the driver, an autonomic nervous index (to be described later) based on an NN interval (a difference between intervals of R waves and R waves) calculated from a time-domain analysis, or the like can be used. In addition, a result of the analysis and calculation from the autonomic nervous index or the like may be used.

The accident risk prediction model training data 50 for training the accident risk prediction model 48 includes past time-series biological-environment-operation information 51 and past accident risk judge information 52. The past time-series biological-environment-operation information 51 is data obtained by aligning and combining biological information of the driver collected in the past, and environment information and operation information (driving information) when the biological information has been collected, with the same time-series granularity as described later.

The accident risk prediction model training unit 32 may add the newly collected time-series biological-environment-operation information 47 to the past time-series biological-environment-operation information 51. In addition, when the accident risk factor label 54 is updated, the accident risk prediction model training unit 32 can perform feedback of the updated accident risk factor label 54 to the accident risk judge information 52.

As will be described later, the accident risk judge information 52 is data obtained by collecting incidents such as an accident or a near miss occurring in the past, and has the same time series as the time series of the past time-series biological-environment-operation information 51.

After training the accident risk prediction model 48 with the past accident risk prediction model training data 50, the time-series biological-environment-operation information generation unit 31 acquires biological information 41, environment information 42, operation information 43, and driving information 44 (S2).

The time-series biological-environment-operation information generation unit 31 performs predetermined pre-processing on the biological information 41 of the driver of the vehicle 8, the environment information 42, the operation information 43, and the driving information 44 corresponding to the time series of the biological information 41 to generate the time-series biological-environment-operation information 47 (S3).

The time-series biological-environment-operation information generation unit 31 excludes or interpolates a missing section of the heart rate data (RRI data), as the pre-processing of the biological information 41. When the length of the missing section exceeds a predetermined threshold value Thf, the time-series biological-environment-operation information generation unit 31 can exclude the heart rate data in this section. When the length of the missing section is equal to or smaller than the predetermined threshold value Thf, the time-series biological-environment-operation information generation unit 31 can perform the interpolation processing. Then, the time-series biological-environment-operation information generation unit 31 calculates an autonomic nervous function index (ANF information) from the pre-processed heart rate data as described later.

The time-series biological-environment-operation information generation unit 31 also performs missing section exclusion or interpolation processing on the environment information 42, the operation information 43, and the driving information 44, similarly to the biological information 41, to generate the respective types of pre-processed information.

Then, as will be described later, the time-series biological-environment-operation information generation unit 31 combines the pre-processed environment information 42, the pre-processed operation information 43, and the pre-processed driving information 44 corresponding to the time series of the ANF information to generate the time-series biological-environment-operation information 47.

Then, the accident risk prediction unit 33 calculates accident risk information 45 by inputting the generated time-series biological-environment-operation information 47 and the past accident risk judge information 52 to the trained accident risk prediction model 48 (S4).

Then, the accident risk factor calculation unit 34 calculates accident risk factor information 46 by inputting the accident risk information 45 calculated by the accident risk prediction unit 33 and the time-series biological-environment-operation information 47 to an accident risk factor calculation model 49 set in advance (S5). The accident risk factor information 46 is an estimation result of a factor of the accident risk information 45 predicted by the accident risk prediction model 48.

Then, when the prediction result (probability) calculated by the accident risk prediction unit 33 exceeds a predetermined threshold value Th1, the prediction result presentation unit 35 acquires a message set in the presentation content dictionary 53 based on the accident risk factor information 46, and transmits a warning message including the accident risk information 45 and the accident risk factor information 46 to the prediction result display terminal 90 of the corresponding driver (S6). When the prediction result (the probability of the accident risk information 45) calculated by the accident risk prediction unit 33 exceeds the predetermined threshold value Th1, the prediction result presentation unit 35 can also notify the administrator, the user, and the like of the driving assistance server 1 of the message.

In the notification when the accident risk information 45 exceeds the threshold value Th1, it is possible to notify the driver of a warning that is easily understood by the driver, by including the base for issuing the warning in the accident risk information 45 in the message in addition to the content of the accident risk information 45.

The prediction result presentation unit 35 can transmit, to the prediction result display terminal 90, a message for urging the driver to input a factor recognized by the driver with respect to the accident risk factor information 46 transmitted to the prediction result display terminal 90. In addition, the prediction result presentation unit 35 can receive the input (factor label) of the driver from the factor label input unit 91 of the prediction result display terminal 90 (S7).

By inputting a factor recognized by the driver for the warning of which the notification has been performed by the driving assistance server 1, and accumulating the input factor as a factor label in the accident risk factor information 46, it is possible to make the warning output by the driving assistance server 1 be information that does not make the driver feel uncomfortable. The factor label from the factor label input unit 91 may be input after the end of driving or after the end of operation. The factor label from the factor label input unit 91 can be input by a driving administrator or the like instead of the driver.

When receiving the input of the factor label from the prediction result display terminal 90, the prediction result presentation unit 35 sets and updates the received factor label in the accident risk factor information 46. The accident risk prediction model training unit 32 can feed back the contents of the accident risk factor information 46 with the updated factor label to the accident risk judge information 52 to reflect the contents into the accident risk prediction model 48 and the accident risk factor calculation model 49.

When training the accident risk prediction model 48 or the accident risk factor calculation model 49, the accident risk prediction model training unit 32 can feed back the accident risk actually encountered by the driver to the accident risk prediction model 48 by using the accident risk judge information 52 with the updated factor label. The accident risk prediction model training unit 32 trains the accident risk prediction model 48 and the accident risk factor calculation model 49 at a predetermined timing (for example, monthly).

Figure 20:
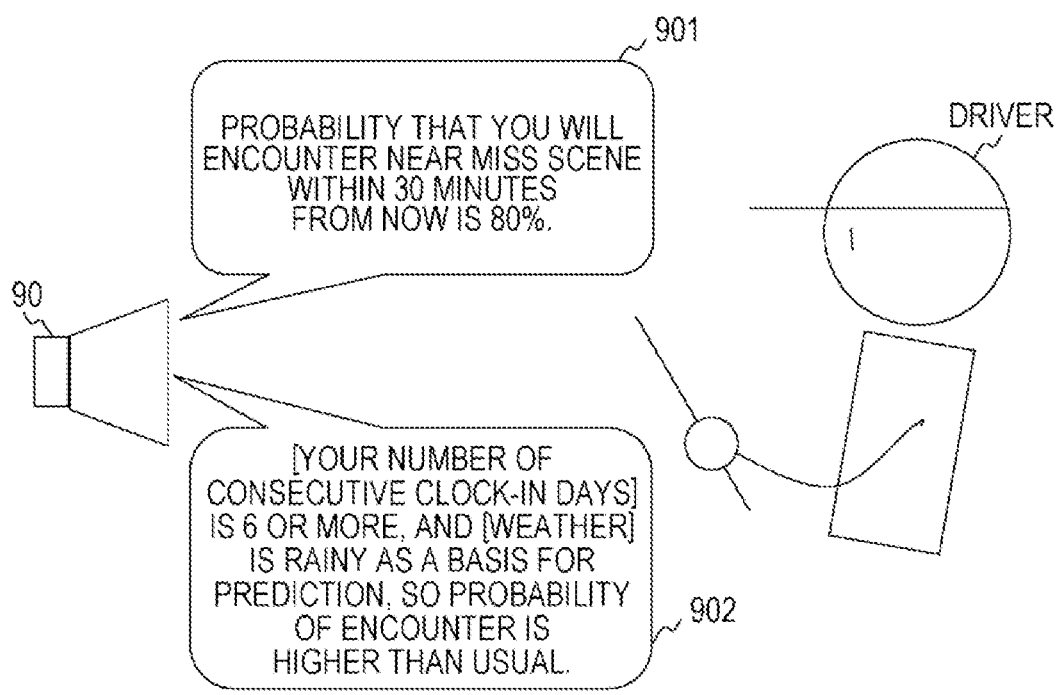
FIG. 20 is a diagram illustrating the embodiment of the present invention and illustrating an example of outputting a prediction result.

FIG. 20 is a diagram illustrating an example in which a warning from the driving assistance server 1 is output by a voice of the prediction result display terminal 90. In the example illustrated in FIG. 20, the prediction result display terminal 90 outputs, by voice, a warning message 901 indicating that the probability of an incident (near miss in FIG. 20) occurring within 30 minutes is 80%, and a factor message 902 indicating that the number of consecutive clock-in days is six and the current weather is rainy as factors of issuing the warning.

The driver can understand that the cause of the call attention is the factor message 902 by the warning message 901, and can call attention without feeling uncomfortable with respect to the warning of which the notification has been received during driving. In addition, a proposal leading to risk reduction may be added together with the warning.

Figure 21:
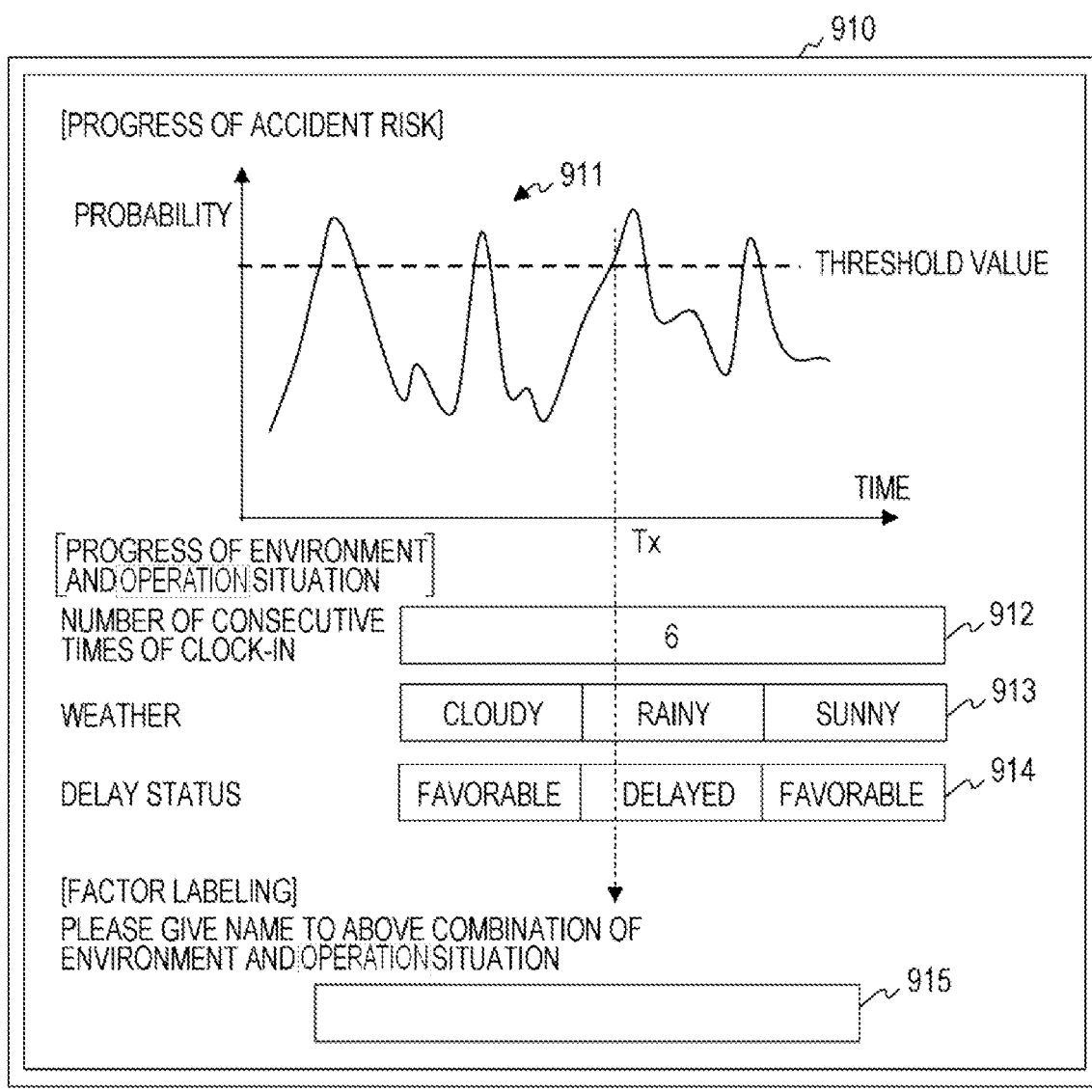
FIG. 21 is a diagram illustrating the embodiment of the present invention and illustrating an example of a screen of a prediction result display terminal.

FIG. 21 is a diagram illustrating an example of a screen for inputting a factor label displayed on the prediction result display terminal 90. A screen 910 is an input screen of the factor label output to the display device of the prediction result display terminal 90. The screen 910 is output by the factor label input unit 91 of the prediction result display terminal 90.

The screen 910 includes a graph 911 of the accident risk information 45 including the time and the accident occurrence probability, the biological information 41 (progress of physical condition/fatigue) 916, regions (number of consecutive times of clock-in 912, weather 913, delay status 914) for displaying the progress of the operation information 43 and the environment information 42, and an input unit 915 of a factor label.

In the example illustrated in FIG. 21, the name of an accident risk factor at a time point Tx when the accident occurrence probability exceeds the predetermined threshold value Th1 is urged to be input. The driver inputs a factor label through an input device (not illustrated) of the prediction result display terminal 90. The factor label input unit 91 transmits the input factor label to the driving assistance server 1.

Figure 22:
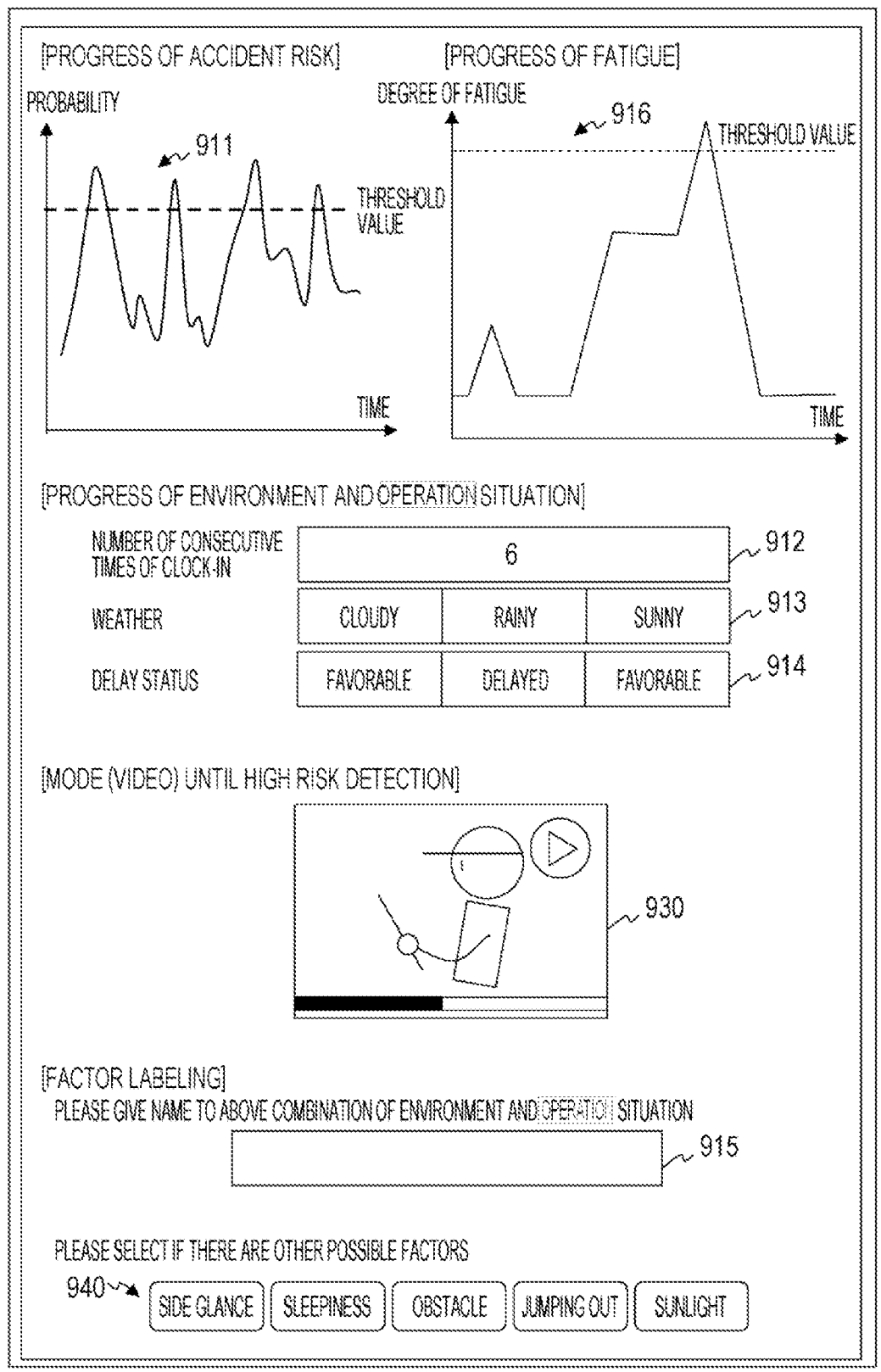
FIG. 22 is a diagram illustrating the embodiment of the present invention and illustrating another example of the screen of the prediction result display terminal.

Regarding the factor label, not only the text may be input to the input unit 915, but also a plurality of factor labels may be displayed as buttons 940 as illustrated in FIG. 22, and the factor label may be selected from the buttons 940.

The screen 910 in FIG. 22 includes not only the elements in FIG. 21, but also a video window 930 showing a driving state before the accident risk information 45 exceeds the threshold value Th1, in addition to the button 940. In the video window 930, it is possible to reproduce a video obtained by tracing back to a predetermined time point from a time point when the accident risk information 45 exceeds the threshold value Th1 (the occurrence time point of the accident risk information 45) among the videos captured by the camera 15 of the vehicle 8. The video captured by the camera 15 is included in the driving information 44 and accumulated in the auxiliary storage device 4.

The video of the driver tracing back to a predetermined time from the occurrence time point of the accident risk information 45 may be provided as the accident risk factor information 46.

The driving assistance server 1 in the present embodiment can present the background of the accident risk information 45 from the biological information 41 (ANF information) and the driving information 44 by integrating the granularities of the measurement intervals of the biological information 41, the environment information 42, the operation information 43, and the driving information 44 in accordance with the calculation interval of the biological information 41 (ANF information) to generate the time-series biological-environment-operation information 47.

That is, when the accident occurrence probability of the accident risk information 45 increases, the driving assistance server 1 causes the accident risk factor calculation model 49 to predict the operation information 43 and the environment information 42, which are factors of the increase, and performs a notification of the factor of the warning when performing a notification of the warning. Thus, it is possible to output the warning that can be understood by the driver.

When the driver is suddenly notified only that the probability of the occurrence of the accident risk has increased while driving the vehicle 8, it is difficult for the driver to immediately understand why the warning has been issued. Therefore, when issuing the warning, the driving assistance server 1 in the present embodiment can notify the driver of information that is easily understood by the driver, by presenting the operation information 43 and the environment information 42, which are the background of the warning.

Details of Data

Next, details of data used in the driving assistance server 1 will be described.

FIG. 3 is a diagram illustrating an example of the biological information 41 measured by the biological information collection device 60. The biological information 41 includes a user ID 411, the date and time 412, heartbeat interval data 413, blood pressure 414, a body temperature 415, and a medical inquiry result 416 in one record.

The user ID 411 stores an identifier of the driver. In the present embodiment, it is assumed that an identifier set in advance in the biological information collection device 60 is used. The date and time 412 stores the date and time when the biological information collection device 60 has measured the data.

The heartbeat interval data 413 stores a heartbeat interval (RRI data) measured by the heart rate meter 61. The blood pressure 414 stores the blood pressure measured by the sphygmomanometer 63. The body temperature 415 stores the body temperature measured by the body thermometer 62. The medical inquiry result 416 stores an inquiry result at the start of work or the like. "Not measured" is stored in an item for which data has not been measured.

FIG. 4 is a diagram illustrating an example of the environment information 42 measured by the environment information collection device 70. The environment information 42 includes an area ID 421, the date 422, a day of the week 423, a time section 424, weather 425, an air temperature 426, and an atmospheric pressure 427 in one record.

The area ID 421 stores an identifier of an area (such as a prefecture) where data has been acquired. The date 422 stores the date when the data has been acquired. The day of the week 423 stores the day of the week on which the data is acquired. The time section 424 stores a start point and an end point of the time at which the data has been acquired.

The weather 425 stores the weather acquired for each area. The air temperature 426 stores the air temperature measured by the air thermometer 71. The atmospheric pressure 427 stores the atmospheric pressure measured by the barometer 72.

FIG. 5 is a diagram illustrating an example of the attendance data 431 in the operation information 43 received by the operation information collection device 80. The attendance data 431 includes a user ID 4311, the clock-in date and time 4312, the previous clock-out date and time 4313, the number of consecutive clock-in days 4314, and a break time 4315 in one record.

The user ID 4311 stores the identifier of the driver. In the present embodiment, the identifier of the biological information 41 is used. The clock-in date and time 4312 and the previous clock-out date and time 4313 store dates and times of clock-in and clock-out. The number of consecutive clock-in days 4314 stores the number of consecutive clock-in days. The break time 4315 stores a break time acquired by the driver.

FIG. 6 is a diagram illustrating an example of delivery data in the operation information 43 received by the operation information collection device 80. The delivery data 432 includes a user ID 4321, the date and time 4322, an area ID 4323, a carried object 4324, a delivery route 4325, and delayed-or-not 4326 in one record.

The user ID 4321 stores the identifier of the driver. In the present embodiment, the identifier of the biological information 41 is used. The date and time 4322 stores the date and time when the delivery has been started. The carried object 4324 stores the type of article to be delivered. The delivery route 4325 stores a delivery route. The delayed-or-not 4326 stores whether or not a delay has been reported in delivery.

The driving information 44 including position information or a traveling route of the vehicle 8 may be included in the delivery data 432 and handled as the operation information 43.

FIG. 12 is a diagram illustrating an example of the time-series biological-environment-operation information 47 generated by the time-series biological-environment-operation information generation unit 31. The past time-series biological-environment-operation information 51 has a similar configuration.

The time-series biological-environment-operation information 47 includes a user ID 471, the date and time 472, an autonomic nervous LF/HF 473, a body temperature 474, an air temperature 475, the number of consecutive clock-in days 476, a delay 477, and a traveling state 478, in one record.

The user ID 471 stores the identifier of the driver. In the present embodiment, the identifier of the biological information 41 is used. The date and time 472 stores the date and time when the biological information collection device 60 has measured the heart rate data as the starting point of an analysis window of the autonomic nervous LF/HF 473 forming the biological information 41.

As will be described later, the autonomic nervous LF/HF 473 is a ratio between a low-frequency (LF) component and a high-frequency (HF) component of the power spectral density of the interval (RRI) of the R waves in the heart rate data. The autonomic nervous LF/HF 473 is stored as a value indicating the balance of the autonomic nerve (sympathetic nerve and parasympathetic nerve). The low-frequency component indicates an activity index of the sympathetic nerve, and the high-frequency component indicates an activity index of the parasympathetic nerve.

The body temperature 474 stores the body temperature measured by the biological information collection device 60. The air temperature 475 stores the air temperature in the environment information 42. The number of consecutive clock-in days 476 stores a value of the number of consecutive clock-in days 4314 of the attendance data 431 in the operation information 43.

The delay 477 stores a value of the delayed-or-not 4326 of the delivery data 432 in the operation information 43. The traveling state 478 stores a traveling state based on the speed and the position in the driving information 44. In the present embodiment, the type of road is stored when the vehicle is traveling, and "stopped" is stored when the vehicle is stopped.

When the driving assistance server 1 predicts an accident risk based on the biological information 41, the environment information 42, and the operation information 43 of the driver regardless of the traveling state of the vehicle 8, the driving assistance server 1 does not need to combine the value of the driving information 44 with the time-series biological-environment-operation information 47.

FIG. 14 is a diagram illustrating an example of the accident risk judge information 52. In the accident risk judge information 52, pieces of information on accidents or incidents occurred in the past are accumulated. The accident risk judge information 52 includes a user ID 521, the detection date and time 522, a vehicle speed 523, an acceleration 524, an inter-vehicle distance 525, camera information 526, an incident presence or absence 527, and an incident factor 528, in one record.

The user ID 521 stores the identifier of the driver. In the present embodiment, the identifier of the biological information 41 is used. The detection date and time 522 stores the date and time when an accident or an incident has occurred. The vehicle speed 523, the acceleration 524, and the inter-vehicle distance 525 store detection values of the vehicle speed, the acceleration, and the inter-vehicle distance when the accident or the incident has occurred, respectively. The camera information 526 indicates image information when the accident or the incident has occurred.

The incident presence or absence 527 stores the presence or absence of an incident (or an accident). When there is an incident (or an accident), "1" is stored. When there is no incident, "0" is stored. The incident factor 528 stores a label of a factor causing the occurrence of the incident (or the accident).

The incident (or the accident) may be automatically detected from the driving information 44 of the inter-vehicle distance sensor 12, the speed sensor 13, the acceleration sensor 14, and the like mounted on the vehicle 8 by a program (not illustrated), a machine learning model, or the like, with information at which a time point at which the possibility of the incident (or accident) is high, such as sudden braking.

For the detected incident (or accident), for example, the administrator or the like of the driving assistance server 1 refers to the camera information before and after the detection date and time 522 to set the incident presence or absence 527. Then, the administrator or the like of the driving assistance server 1 determines the incident factor 528, and inputs a label by text or the like. A machine learning model set in advance may perform setting of the incident presence or absence 527 and determination and setting of the incident factor 528.

Figure 23:
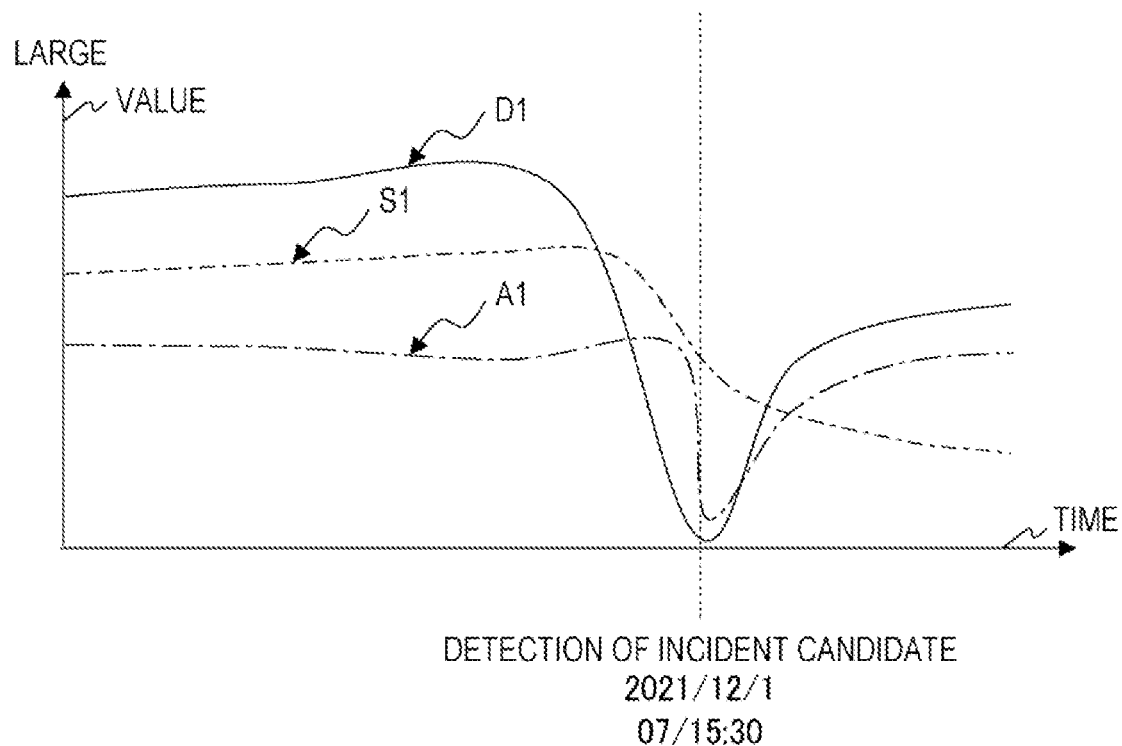
FIG. 23 is a graph illustrating the embodiment of the present invention and illustrating an example of data registered in accident risk judge information.

Regarding the determination of the incident (or the accident), as illustrated in FIG. 23, the occurrence of the incident is detected in a deceleration state in which the inter-vehicle distance D1 corresponding to the vehicle speed S1 is less than a predetermined threshold value or the acceleration A1 is less than a threshold value. The driving assistance server 1 acquires a video captured by the camera 15 from the driving information 44 before and after a time point at which the occurrence of the incident has been detected, and displays the video on the output device 7. The administrator of the driving assistance system determines the factor of the incident (or the accident) from the videos before and after the incident from the output device 7, and inputs the factor label from the input device 6.

FIG. 16 is a diagram illustrating an example of the accident risk information 45. The accident risk information 45 stores a prediction result calculated by the accident risk prediction unit 33. The accident risk information 45 includes a user ID 451, a measurement time point 452, time-series biological-environment-operation information 453, a prediction target time section 454, and an accident occurrence probability 455, in one record.

The user ID 451 stores the identifier of the driver. In the present embodiment, the identifier of the biological information 41 is used. The measurement time point 452 stores the date and time when the prediction has been made. The time-series biological-environment-operation information 453 stores a pointer for specifying the time-series biological-environment-operation information 47 used in prediction.

The prediction target time section 454 stores a start point and an end point of time in which the accident risk is predicted. The end point is after a predetermined time predicted by the accident risk prediction model 48. The accident occurrence probability 455 stores a value representing the probability of the occurrence of an accident or an incident in percentage.

FIG. 18 is a diagram illustrating an example of the accident risk factor information 46. The accident risk factor information 46 stores the factor calculated by the accident risk factor calculation unit 34.

The accident risk factor information 46 includes a user ID 461, an accident risk 462, a first accident risk factor 463, a second accident risk factor 464, and a factor label 465, in one record.

The user ID 461 stores the identifier of the driver. In the present embodiment, the identifier of the biological information 41 is used. The accident risk stores a pointer of the corresponding accident risk information 45. The first accident risk factor 463 stores an element acting as the largest factor of the accident or the incident output by the accident risk factor calculation model 49. The second accident risk factor 464 stores an element acting as the second largest factor output by the accident risk factor calculation model 49. The factor label 465 stores the factor label received from the prediction result notification device 9.

The accident risk factor calculation model 49 extracts items and values acting as factors of the accident occurrence probability 455 from the environment information 42 and the operation information 43 of the driver for which the accident risk information 45 has been calculated. Then, the accident risk factor calculation model 49 outputs the first accident risk factor 463 and the second accident risk factor 464.

In addition, the first accident risk factor 463 and the second accident risk factor 464 can be distinguished from each other, for example, such that an item having the largest probability of being a factor of the accident occurrence probability 455 is set as the first accident risk factor 463, and the next item is set as the second accident risk factor 464.

The items of the accident risk factor calculation unit 34 are not limited to the illustrated items, and may be items included in the biological information 41, the environment information 42, the operation information 43, and the driving information 44. Items to be integrated as the time-series biological-environment-operation information 47 may be set in advance.

Although not illustrated, the presentation content dictionary 53 includes a template of a message of which the driver is notified. A sentence example corresponding to the magnitude of the accident occurrence probability 455 and the contents of the first accident risk factor 463 and the second accident risk factor 464 is set in advance.

Although not illustrated, the accident risk factor label 54 may be any information in which the factor label is associated with the first accident risk factor 463 or the second accident risk factor 464.

Details of Processing

Figure 7:
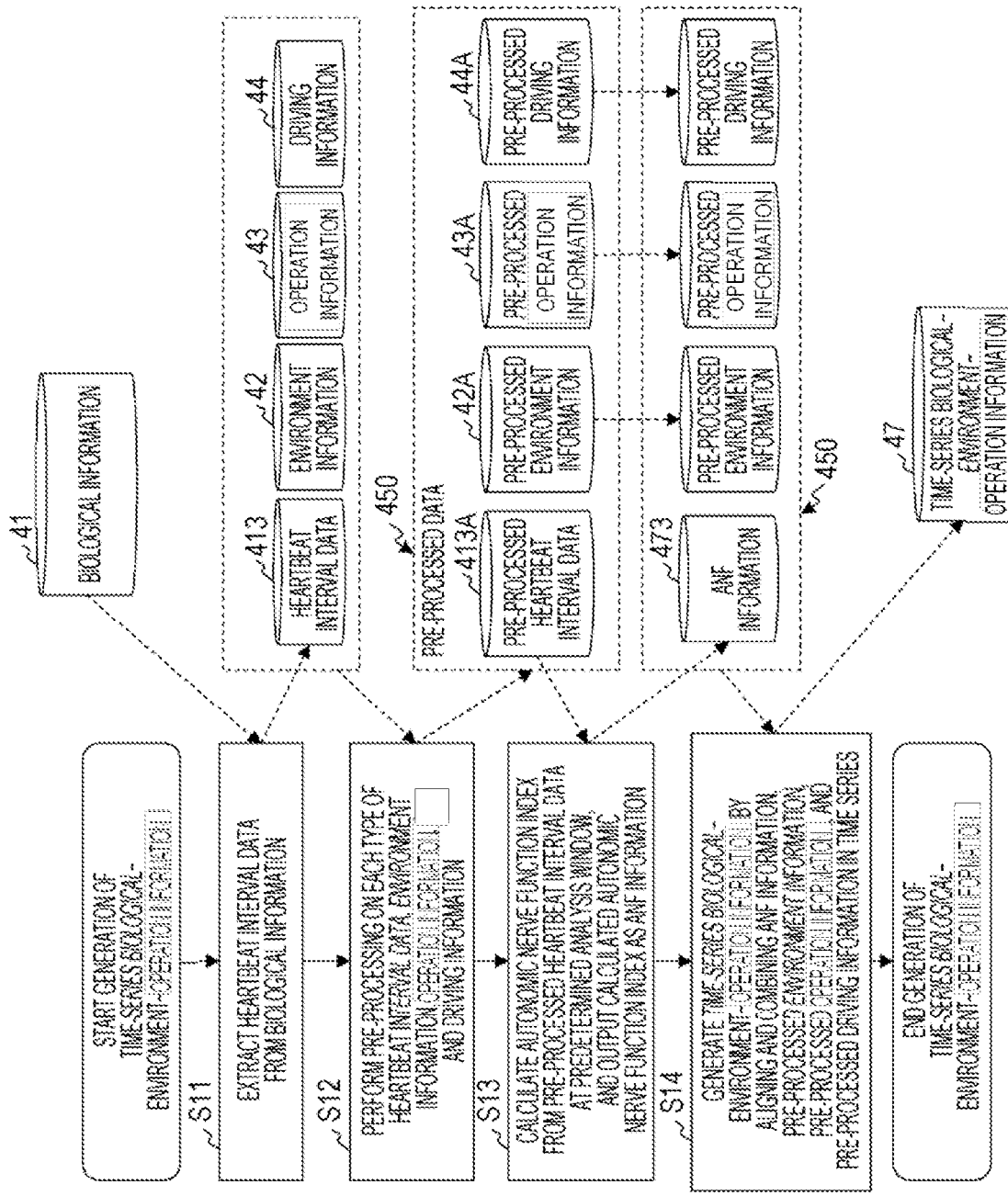
FIG. 7 is a flowchart illustrating the embodiment of the present invention and illustrating an example of a process performed by a time-series biological-environment-operation information generation unit.

Details of the processing illustrated in FIG. 2 will be described below. FIG. 7 is a flowchart illustrating an example of a process performed by the time-series biological-environment-operation information generation unit 31. This process is a process performed in Step S3 in FIG. 2.

The time-series biological-environment-operation information generation unit 31 first extracts heartbeat interval data 413 from the biological information 41 acquired in Step S2 in FIG. 2 (S11). The time-series biological-environment-operation information generation unit 31 may also extract data of the blood pressure 414 and the body temperature 415 corresponding to the heartbeat interval data 413 in the biological information 41.

Then, the time-series biological-environment-operation information generation unit 31 performs pre-processing such as exclusion or interpolation of a missing section, on each type of the extracted heartbeat interval data 413, and the environment information 42, the operation information 43, and the driving information 44 acquired in Step S2, to generate pre-processed data 450 (S12). The pre-processed data 450 includes pre-processed heartbeat interval data 413A, pre-processed environment information 42A, pre-processed operation information 43A, and pre-processed driving information 44A.

Regarding the determination of the missing section, the biological information 41 to the driving information 44 have different data measurement (or acquisition) intervals. Therefore, as the threshold value Thf for determining the missing section, different values for the respective types of the heartbeat interval data 413, the environment information 42, the operation information 43, and the driving information 44 can be set.

Then, as will be described later, the time-series biological-environment-operation information generation unit 31 calculates an autonomic nervous function LF/HF as an autonomic nerve function index from the pre-processed heartbeat interval data 413A at a predetermined analysis window (time width), and accumulates the autonomic nervous function LF/HF in the pre-processed data 450 as ANF information 473 (S13).

Figure 8:
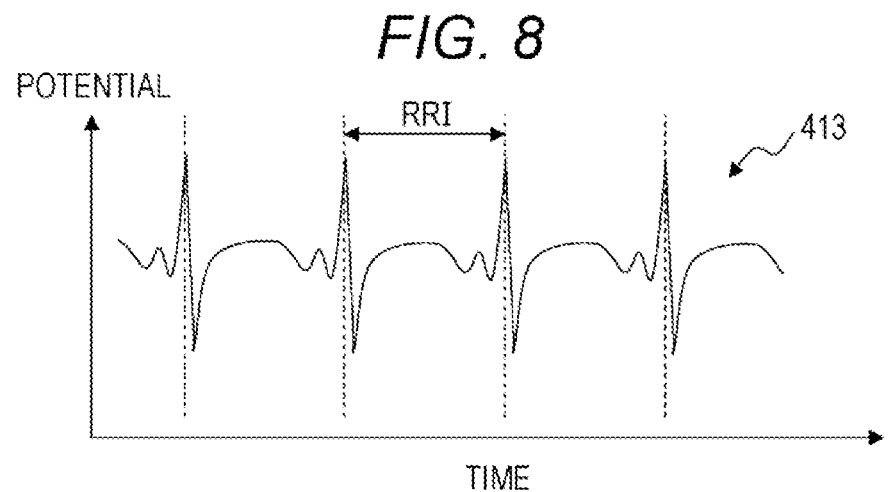
FIG. 8 is a graph illustrating the embodiment of the present invention and illustrating an example of heart rate data.
Figure 9:
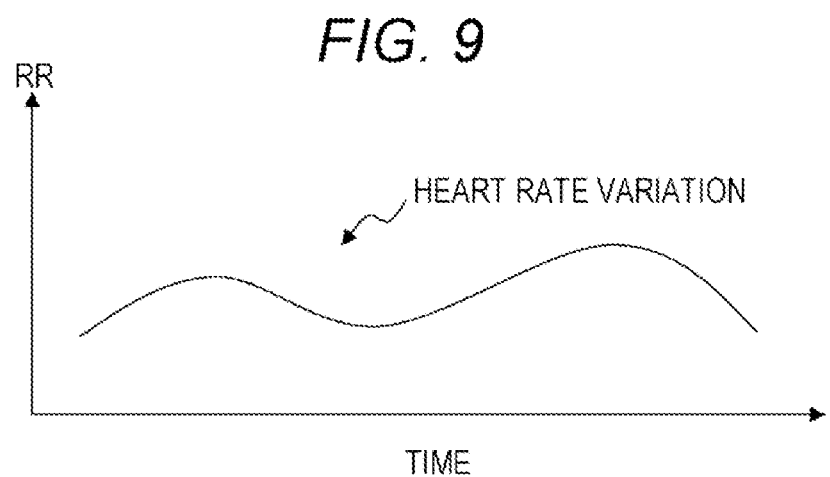
FIG. 9 is a graph illustrating the embodiment of the present invention and illustrating an example of heart rate variation.

The ANF information 473 is calculated as follows. The time-series biological-environment-operation information generation unit 31 calculates heartbeat interval data (RRI data) of an analysis window (predetermined period) ΔTw from the pre-processed heartbeat interval data 413A illustrated in FIG. 8, as heart rate variation time-series data, and further calculates variation from the heart rate variation time-series data. FIG. 9 is a graph illustrating an example of variation of the heartbeat interval data (heart rate variation) calculated by the time-series biological-environment-operation information generation unit 31. The RRI in the heartbeat interval data is not constant and varies depending on the activity of the autonomic nerve or the like.

The time-series biological-environment-operation information generation unit 31 performs a frequency spectrum analysis on the heart rate variation time-series data to calculate power spectral density (PSD). A known method may be applied to the calculation of the power spectral density.

Figure 10:
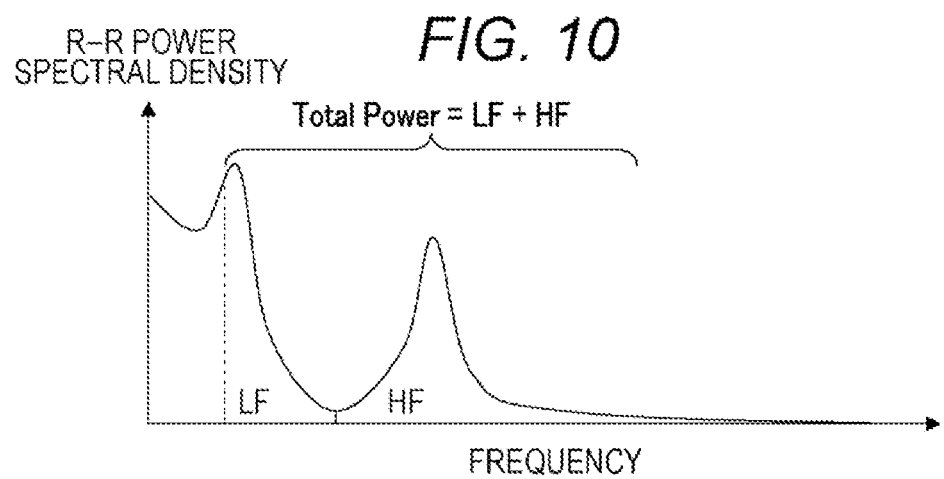
FIG. 10 is a graph illustrating the embodiment of the present invention and illustrating an example of power spectral density of the heart rate variation.

Then, the time-series biological-environment-operation information generation unit 31 calculates the intensity LF of the low-frequency component and the intensity HF of the high-frequency component in the power spectral density. FIG. 10 is a graph illustrating an example of the frequency domain of the power spectral density of the heart rate variation.

As illustrated in FIG. 10, the time-series biological-environment-operation information generation unit 31 calculates, as autonomic nerve total power, a value obtained by summing (LF+HF) intensity (integral value) LF in a low-frequency component region (0.05 Hz to 0.15 Hz) and intensity (integral value) HF in a high-frequency component region (0.15 Hz to 0.40 Hz) of the power spectrum.

In addition, the time-series biological-environment-operation information generation unit 31 calculates, as the ANF information 473, a ratio (autonomic nervous LF/HF) between the intensity LF of the low-frequency component and the intensity HF of the high-frequency component of the power spectrum.

With the above process, the driving assistance server 1 calculates the heart rate variation time-series data for each analysis window ΔTw from the heartbeat interval data of the biological information 41, and further calculates the ratio between the intensity of the low-frequency component and the intensity of the high-frequency component, as the ANF information 473.

The high-frequency component in the ANF information 473 appears in the heart rate variation when the parasympathetic nerve is activated (tensioned). The low-frequency component appears in the heart rate variation both when the sympathetic nerve is activated (tensioned) and when the parasympathetic nerve is activated (tensioned).

Since it is known that the driver is in a stress state when the sympathetic nerve is activated and is in a relaxed state when the parasympathetic nerve is activated, it is possible to determine whether the driver is in the stress state or the relaxed state, from the intensity LF of the low-frequency component and the intensity HF of the high-frequency component.

Then, the time-series biological-environment-operation information generation unit 31 aligns the time widths of the ANF information 473, the pre-processed environment information 42A, the pre-processed operation information 43A, and the pre-processed driving information 44A, and generates the time-series biological-environment-operation information 47 obtained by combining the ANF information 473, the pre-processed environment information 42A, the pre-processed operation information 43A, and the pre-processed driving information 44A (S14).

The ANF information 473 is generated for each predetermined analysis window ΔTw for which the pre-processed heartbeat interval data 413A is acquired. The time interval of the analysis window ΔTw is, for example, 1 minute. On the other hand, the pre-processed environment information 42A is acquired at a time interval such as every 1 hour. Data of the pre-processed driving information 44A is collected at a measurement interval (for example, one second interval) of the sensor of the vehicle 8. The pre-processed operation information 43A is irregularly recorded in accordance with the break of the operation of the driver.

Figure 11:
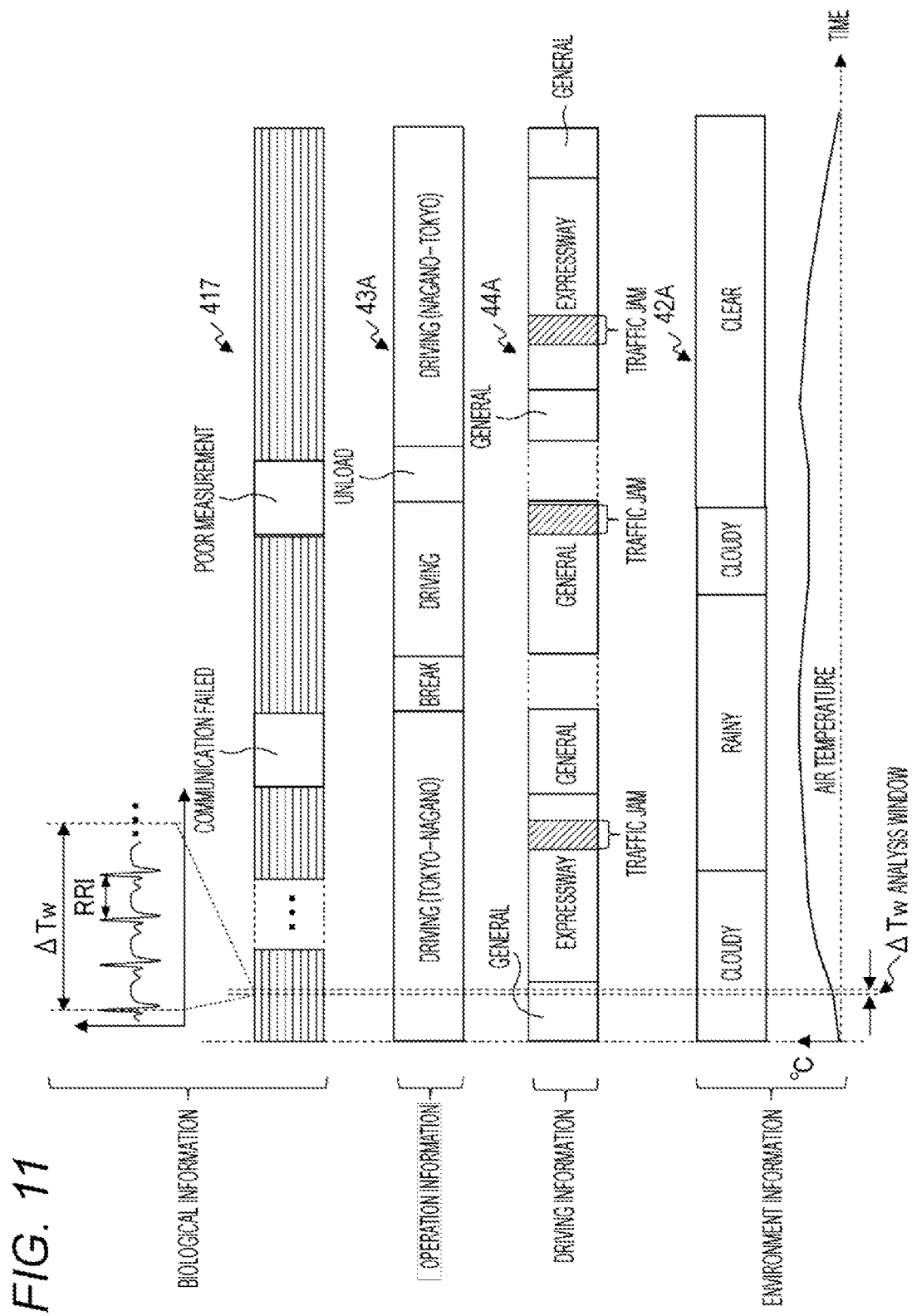
FIG. 11 is a diagram illustrating the embodiment of the present invention and illustrating an example of data shaping performed by the time-series biological-environment-operation information generation unit.

As illustrated in FIG. 11, the measurement (or acquisition) timings of the pre-processed environment information 42A to the pre-processed driving information 44A are different from the calculation interval (analysis window ΔTw) of the ANF information 473. In addition, the granularity of the measurement interval (acquisition interval) is also different.

Therefore, the time-series biological-environment-operation information generation unit 31 shapes types of data of the pre-processed environment information 42A to the pre-processed driving information 44A in accordance with the calculation interval of the ANF information 473 which is the biological information 41 of a monitoring target for issuing the warning. Then, the time-series biological-environment-operation information generation unit 31 combines the pieces of shaped data to generate the time-series biological-environment-operation information 47 of one record.

In the case of the pre-processed driving information 44A having a time interval shorter than the calculation interval (analysis window ΔTw) of the ANF information 473, the time-series biological-environment-operation information generation unit 31 calculates a representative value such as an average value within the time interval of the analysis window ΔTw, as a value corresponding to the ANF information 473.

On the other hand, in the case of the pre-processed environment information 42 A or the pre-processed operation information 43 A having a time interval that is longer than the calculation interval (analysis window ΔTw) of the ANF information 473, the time-series biological-environment-operation information generation unit 31 acquires data immediately after (or immediately before) the analysis window ΔTw, as data corresponding to the ANF information 473.

As described above, the time-series biological-environment-operation information generation unit 31 combines the types of data of the pre-processed environment information 42A, the pre-processed operation information 43A, and the pre-processed driving information 44A into one record after matching with the interval of the analysis window ΔTw of the ANF information 473, to generate the time-series biological-environment-operation information 47.

As a result, the time-series biological-environment-operation information 47 can be generated without deviation in the time-series direction as illustrated in FIG. 12, in a manner that the pre-processed environment information 42A, the pre-processed operation information 43A, and the pre-processed driving information 44A corresponding to the time series of the ANF information 473 are combined based on the time interval of the ANF information 473 calculated for each analysis window ΔTw for acquiring the heartbeat interval data 413.

The data accumulated in the time-series biological-environment-operation information 47 is reflected in the past accident risk prediction model training data 50 at a predetermined timing.

Figure 13:
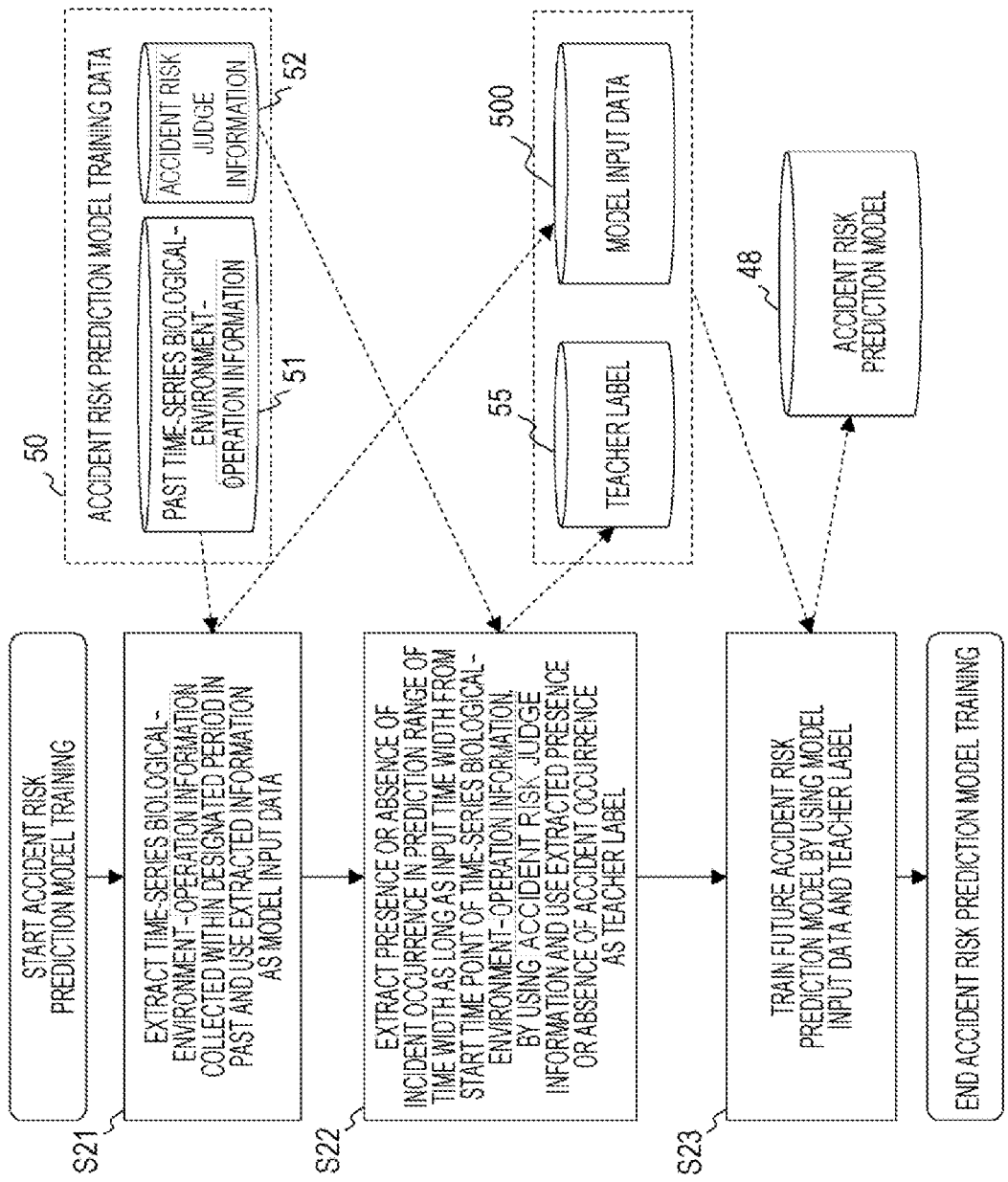
FIG. 13 is a flowchart illustrating the embodiment of the present invention and illustrating an example of a process performed by an accident risk prediction model training unit.

FIG. 13 is a flowchart illustrating an example of a process performed by the accident risk prediction model training unit 32. This process is a process performed in Step S1 in FIG. 2.

The accident risk prediction model training unit 32 receives a designated period of data to be used for training, extracts data within the designated period from the past time-series biological-environment-operation information 51 in the accident risk prediction model training data 50, and generates the extracted data as model input data 500 (S21).

The designated period can be received from the input device 6 or an external computer, and is input by the user or the administrator of the driving assistance system. In addition, the designated period desirably has a time width of 2 minutes to several hours.

Then, the accident risk prediction model training unit 32 acquires accident risk judge information 52 in which past information in which the administrator or the computer has determined an actual accident or an incident leading to an accident has been set in advance. Then, the accident risk prediction model training unit 32 extract information on the presence or absence of an incident occurrence from the past time-series biological-environment-operation information 51 within the designated period, and uses the extracted information as a teacher label 55 (S22).

In this process, the future in which an incident is predicted from the past time-series biological-environment-operation information 51 means a period within a designated period or a period similar to the designated period. For example, when the designated period is 30 minutes, if the time point of the occurrence of the incident in the accident risk judge information 52 is an incident within 30 minutes from the start time point of the time-series biological-environment-operation information 51, a label of the occurrence of the incident is given to this time point, and is used as the teacher label 55. That is, the incident factor 528 corresponding to the incident presence or absence 527 registered in the accident risk judge information 52 is associated with the past time-series biological-environment-operation information 51 in a section tracing back any time width (30 minutes or the like) from the corresponding time point, as the teacher label of the accident risk prediction model 48.

Then, the accident risk prediction model 48 of outputting an accident risk in the future (after a predetermined time: for example, after 30 minutes) is trained by using the model input data 500 extracted in Step S21 and the teacher label 55 generated in Step S22 (S23).

Figure 24:
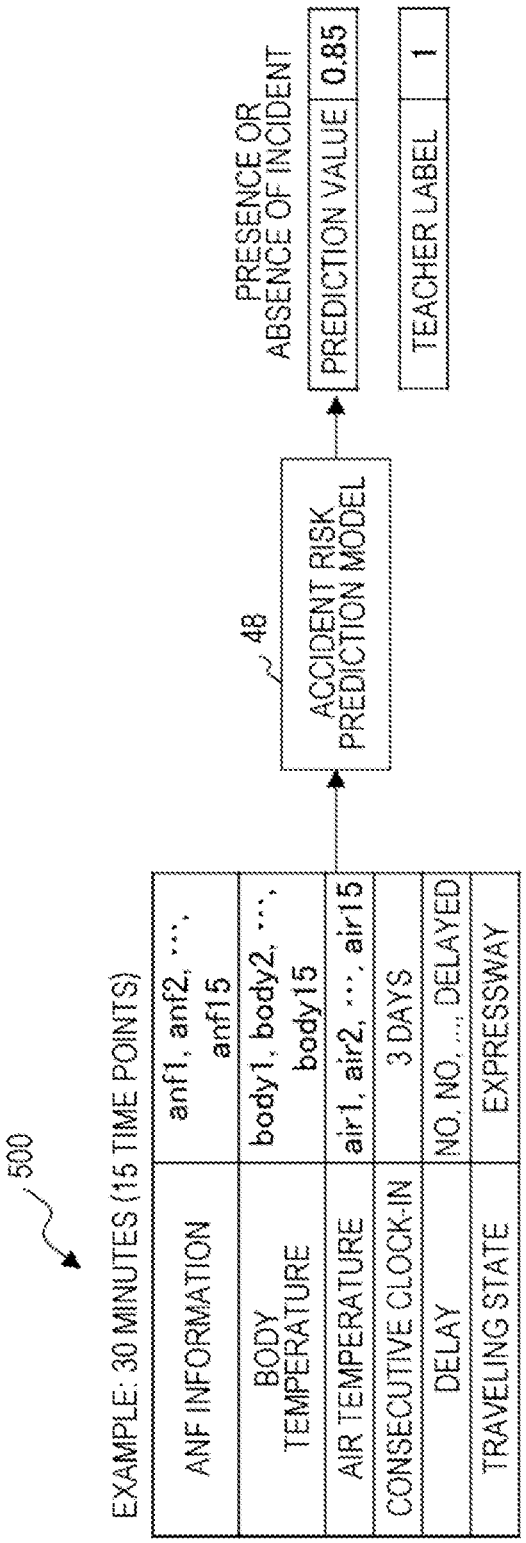
FIG. 24 is a diagram illustrating the embodiment of the present invention and illustrating an example of training of an accident risk prediction model.

FIG. 24 illustrates an example of training the accident risk prediction model 48. While the presence or absence of the incident corresponding to the teacher label 55 is a binary value of "0" or "1", the value output by the accident risk prediction model 48 is a continuous value falling within a range of 0 to 1, for example. When the accident risk prediction model 48 is applied, a process, for example, using the predicted continuous value as it is, or setting and converting a threshold value is performed to calculate an accident occurrence probability of 0 to 100%.

In the above training, it is possible to improve the prediction accuracy of the accident risk prediction model 48 by adding new time-series biological-environment-operation information 47 to the past time-series biological-environment-operation information 51 and using the accident risk judge information 52 with the added accident risk factor label 54.

Figure 15:
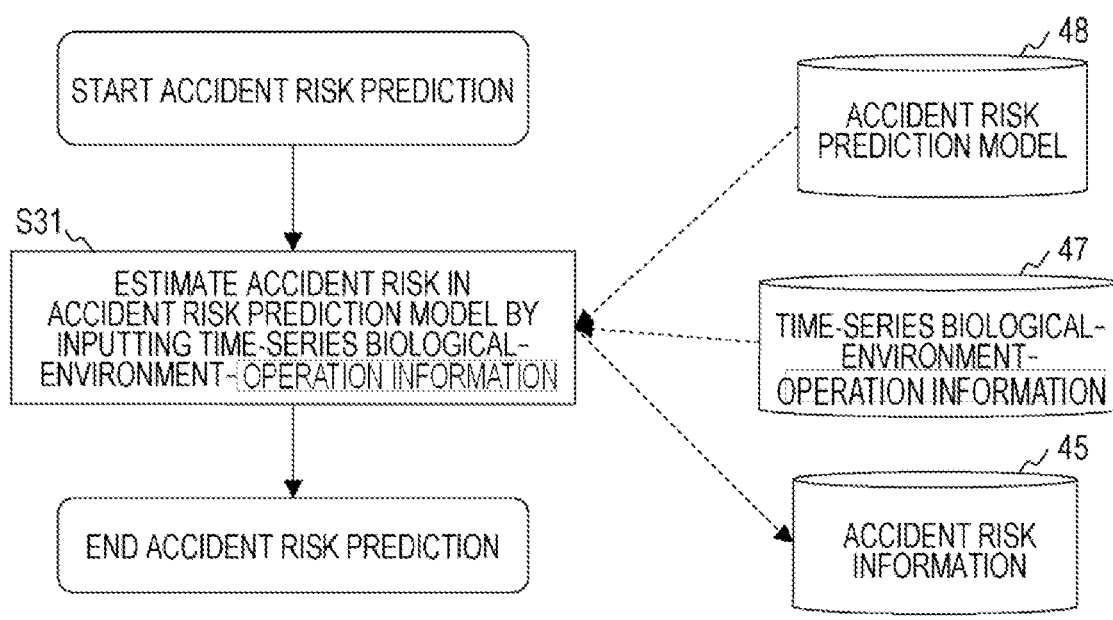
FIG. 15 is a flowchart illustrating the embodiment of the present invention and illustrating an example of a process performed by an accident risk prediction unit.

FIG. 15 is a flowchart illustrating an example of a process performed by the accident risk prediction unit 33. This process is a process performed in Step S4 in FIG. 2. The accident risk prediction unit 33 acquires the time-series biological-environment-operation information 47, and inputs the time-series biological-environment-operation information 47 to the trained accident risk prediction model 48 to cause the accident risk prediction model 48 to predict an accident risk of the driver after a predetermined time. The accident risk prediction unit 33 stores the accident occurrence probability output by the accident risk prediction model 48 as the accident risk information 45 in the auxiliary storage device 4 (S31).

The accident risk prediction unit 33 stores the user ID 471 of the time-series biological-environment-operation information 47 in the user ID 451 of the accident risk information 45, and similarly stores the date and time 472 of the time-series biological-environment-operation information 47 in the measurement time point 452. The accident risk prediction unit 33 stores the pointer for specifying a record of the time-series biological-environment-operation information 47 in the time-series biological-environment-operation information 453, and stores a range of the prediction time point output by the accident risk prediction model 48 in the prediction target time section 454. The accident risk prediction unit 33 stores the accident occurrence probability output by the accident risk prediction model 48 in the accident occurrence probability 455.

The data as a processing target, which is input to the accident risk prediction model 48 by the accident risk prediction unit 33, is unprocessed data in the time-series biological-environment-operation information 47.

With the above process, the data of the time-series biological-environment-operation information 47 is input to the trained accident risk prediction model 48, and the accident risk information 45 after a predetermined time is output for each driver.

The accident risk prediction unit 33 may omit generation of the accident risk information 45 when the accident occurrence probability output by the accident risk prediction model 48 is equal to or less than a predetermined threshold value Th2 (for example, 5%).

Figure 17:
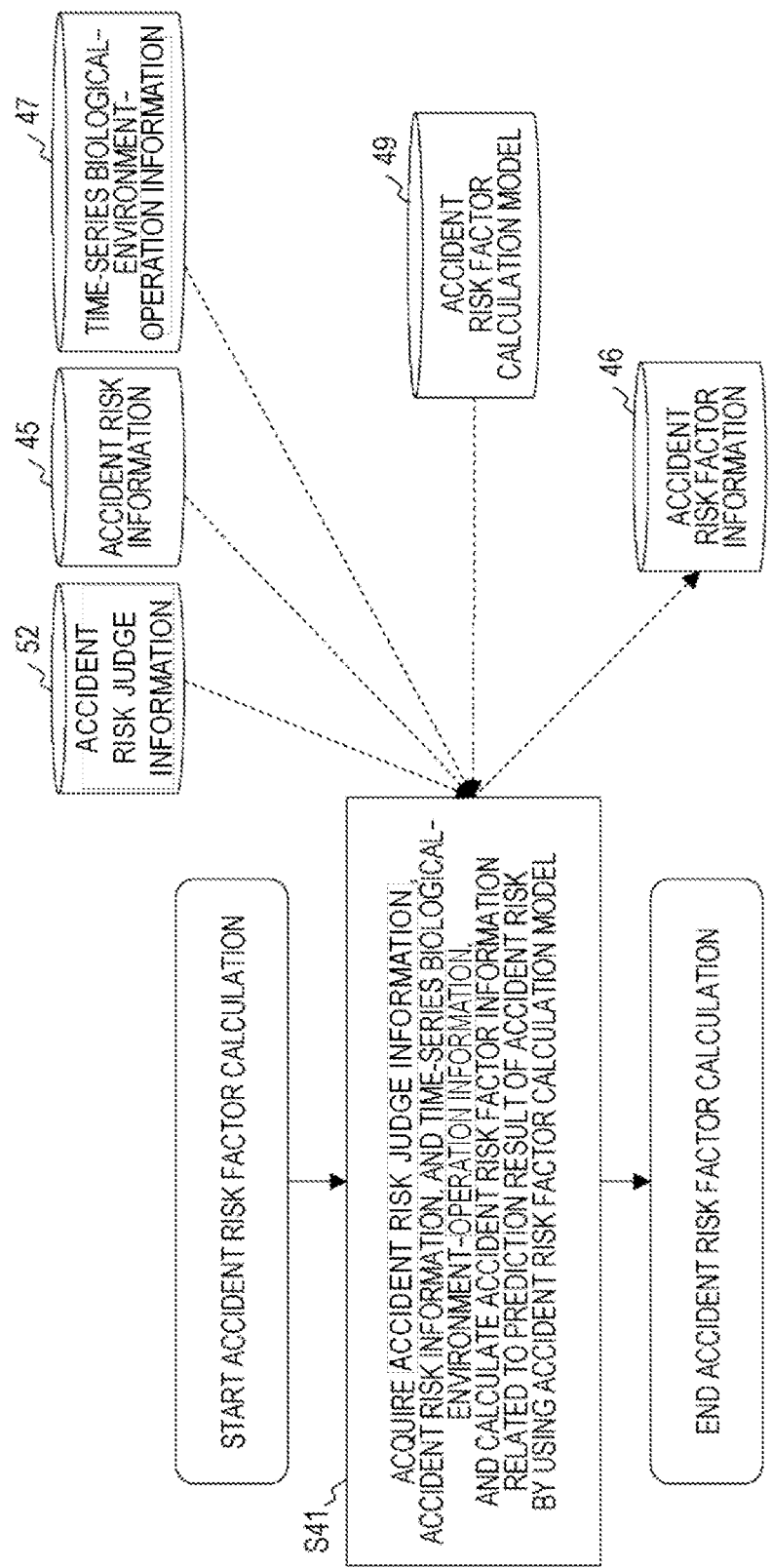
FIG. 17 is a flowchart illustrating the embodiment of the present invention and illustrating an example of a process performed by an accident risk factor calculation unit.

FIG. 17 is a flowchart illustrating an example of a process performed by the accident risk factor calculation unit 34. This process is a process performed in Step S5 in FIG. 2.

The accident risk factor calculation unit 34 acquires the accident risk information 45 output by the accident risk prediction unit 33, the accident risk judge information 52 obtained by collecting past cases, and the time-series biological-environment-operation information 47 input to the accident risk prediction unit 33. The accident risk factor calculation unit 34 inputs the acquired types of information to the accident risk factor calculation model 49 set in advance, to generate accident risk factor information 46 (S41).

The accident risk factor calculation unit 34 stores the user ID 451 of the accident risk information 45 in the user ID 461 of the accident risk factor information 46, and stores the pointer for specifying a record of the accident risk information 45 in the accident risk 462. The accident risk factor calculation unit 34 stores the first and second accident risk factors output by the accident risk prediction model 48 in the first accident risk factor 463 and the second accident risk factor 464, respectively, and stores the incident factor 528 of the accident risk judge information 52 in the factor label 465.

With the above process, for the driver for which the accident risk information 45 has been generated, factors predicted by the accident risk factor calculation model 49 from the incident factors 528 of the current time-series biological-environment-operation information 47 and the past accident risk judge information 52 are generated as the first accident risk factor 463, the second accident risk factor 464, and the factor label 465.

The accident risk factor calculation unit 34 sets "none" in the factor label 465 of the accident risk factor information 46 for data in which the incident factor 528 of the accident risk judge information 52 is blank. In addition, the first accident risk factor 463 indicates a main factor by which the accident risk has occurred, and the second accident risk factor 464 indicates a background factor by which the accident risk has increased.

The accident risk factor information 46 in FIG. 18 illustrates an example in which the first accident risk factor 463 is estimated based on the operation information 43 as a main factor that "the number of consecutive clock-in days exceeds six days", and the second accident risk factor 464 is estimated based on the environment information 42 as a factor in the background that it rains.

Figure 19:
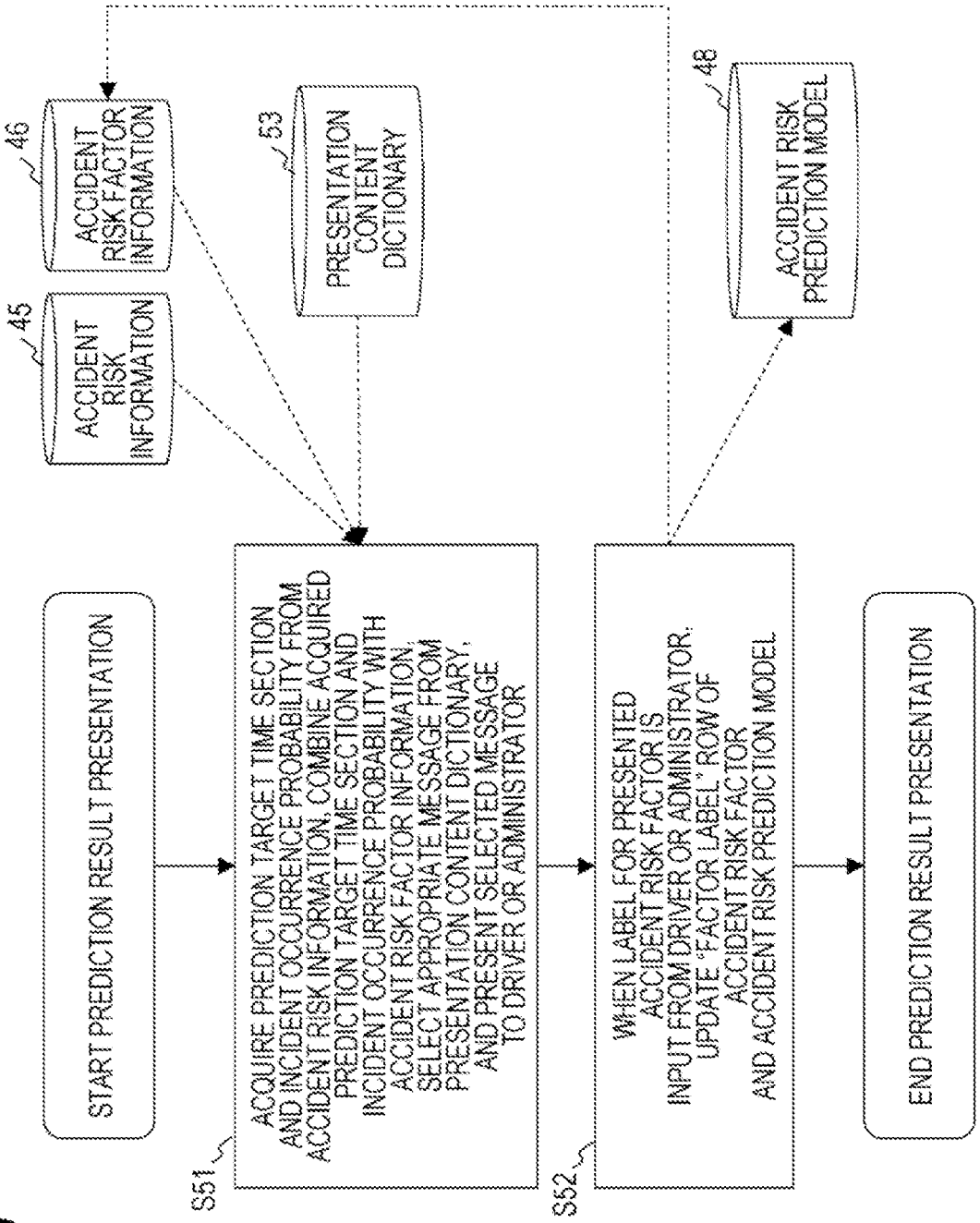
FIG. 19 is a flowchart illustrating the embodiment of the present invention and illustrating an example of a process performed by a prediction result presentation unit.

FIG. 19 is a flowchart illustrating an example of a process performed by the prediction result presentation unit 35. This process is performed in Steps S6 and S7 in FIG. 2.

The prediction result presentation unit 35 acquires the prediction target time section 454 and the accident occurrence probability 455 from the accident risk information 45, and performs processes as follows when the accident occurrence probability 455 exceeds the predetermined threshold value Th1.

The prediction result presentation unit 35 acquires the first accident risk factor 463, the second accident risk factor 464, and the factor label 465 from the accident risk factor information 46 corresponding to the accident risk information 45. The prediction result presentation unit 35 searches the presentation content dictionary 53 for the accident occurrence probability 455, and the first accident risk factor 463 or the second accident risk factor 464 to acquire a template of a sentence. The prediction result presentation unit 35 inserts the accident occurrence probability 455, the prediction target time section 454, and the first accident risk factor 463 or the second accident risk factor 464 into the acquired template to generate a warning or a call attention message. Then, the prediction result presentation unit 35 transmits the generated warning or call attention message to the prediction result display terminal 90 used by the driver or the administrator (S51).

In addition, the prediction result presentation unit 35 transmits information for receiving the factor label in addition to the message. When receiving the factor label input by the driver, the administrator, or the like with the prediction result display terminal 90, the prediction result presentation unit 35 updates (or adds) the factor label 465 of the accident risk factor information 46 (S52).

When the accident risk factor information 46 is updated, the prediction result presentation unit 35 can feed back the updated information to the accident risk judge information 52 and add the content of the factor label 465 to the incident factor 528. As a result, it is possible to reflect the incident factor 528 set by the driver or the like when the accident risk prediction model 48 is trained. Then, the driving assistance server 1 can generate and transmit a message that does not make the driver feel uncomfortable.

As described above, the driving assistance server 1 in the present embodiment combines the types of information having different measurement intervals and acquisition intervals, for example, the environment information 42, the operation information 43, and the driving information 44, with each other in accordance with the time interval at which the biological information 41 is calculated, to generate the time-series biological-environment-operation information 47 and stores the generated time-series biological-environment-operation information 47 in time series. Then, the driving assistance server 1 predicts an accident occurrence probability 455 (accident risk information 45) after a predetermined time (future) by using the time-series biological-environment-operation information 47 in accordance with the calculation interval of the biological information 41, and transmits a warning or a call attention message when the accident occurrence probability 455 exceeds the threshold value Th1.

As a result, by integrating the environment information 42, the operation information 43, and the driving information 44 that affect the accident occurrence probability 455 into information in accordance with the calculation interval of the biological information 41, it is possible to improve the prediction accuracy of an accident or an incident.

In addition, the driving assistance server 1 calculates the accident risk factor information 46 by inputting the accident risk information 45 of the prediction result, the past accident risk judge information 52, and the new time-series biological-environment-operation information 51 to the accident risk factor calculation model 49, and includes the cause of the accident risk in the message. Thus, it is possible to present the reason for warning or call attention to the driver. By adding the factor of an accident risk in addition to a warning or call attention, it is possible to perform a notification of a message without discomfort.

In addition, by inputting, to the accident risk factor calculation model 49, the time-series biological-environment-operation information 47 obtained by integrating data of the environment information 42, the operation information 43, and the driving information 44 such that the time-series of the granularities of the environment information 42, the operation information 43, and the driving information 44 match with the calculation interval of the biological information 41, it is possible to calculate the accident risk factor information 46 having no time series deviation.

In addition, the driving assistance server 1 can receive a label for the accident risk factor from the prediction result display terminal 90 with respect to the accident risk information 45 transmitted to the prediction result display terminal 90, and feedback the received label to the accident risk prediction model 48 and the accident risk factor calculation model 49. As a result, it is possible to issue a warning that does not make the driver feel uncomfortable.

In addition, the driving assistance server 1 provides a video of the driving state before the occurrence time point of the accident risk information 45 as the accident risk factor information 46, so that it is possible to notify the driver without feeling uncomfortable.

CONCLUSION

As described above, the above-described embodiment can have the following configurations.

(1) A driving assistance method in which a computer (driving assistance server 1) including a processor (2) and a memory (3) assists driving of a vehicle (8), the driving assistance method including: by the computer (1), acquiring biological information (41) of a driver who is driving the vehicle (8) (biological information collection device 60); acquiring environment information (42) of the driver (environment information collection device 70); acquiring operation information (43) of the driver (operation information collection device 80); generating biological index data from the biological information (41) (S31); generating integrated information (time-series biological-environment-operation information 47) by aligning and combining time series of the biological index data (ANF information 473), the environment information (42), and the operation information (time-series biological-environment-operation information generation unit 31); calculating accident risk information (45) after a predetermined time, by inputting the integrated information (31) to an accident risk prediction model (48) set in advance (S4); and calculating factor information (accident risk factor information 46) of the accident risk information (45) by inputting the accident risk information (45), the integrated information (31), and accident risk judge information (52) set in advance to a factor calculation model (accident risk factor calculation model 49) set in advance (accident risk factor calculation unit 34).

With the above configuration, the driving assistance server 1 not only predicts accident risk information 45 after a predetermined time, but also outputs accident risk factor information 46, so that it is possible to present information that does not make the driver feel uncomfortable.

(2) The driving assistance method described in (1), further including outputting, by the computer, the accident risk information (45) and the factor information (46) when the accident risk information (45) satisfies a predetermined condition (exceeding a threshold value Th1) (S6).

With the above configuration, the driving assistance server 1 outputs the accident risk information 45 and the accident risk factor information 46 to the prediction result display terminal 90, when the accident risk information 45 after the predetermined time satisfies the predetermined condition. In addition to the fact that the accident risk to the driver has increased, it is possible to present the factors of the accident risk.

(3) The driving assistance method described in (2), further including updating, by the computer, the factor information (46) with a factor label when the computer receives the factor label for the output factor information (46) (S7).

With the above configuration, by updating the accident risk judge information 52 with the factor label set by the driver or an administrator, it is possible to reflect an accident risk actually encountered by the driver.

(4) The driving assistance method described in (3), further including, by the computer, reflecting the factor label used to update the factor information (46) to the accident risk judge information (52), and performing learning of the factor calculation model (49) with the accident risk judge information (52) in which the factor label has been reflected (S48).

With the above configuration, when the accident risk prediction model 48 is trained again, it is possible to feed back the accident risk actually encountered by the driver to the accident risk prediction model 48 by using the accident risk judge information 52 with the updated factor label.

(5) In the driving assistance method described in (1), in which, in the generating of the integrated information, when the biological information (41), the environment information (42), and the operation information are integrated, values of the environment information (42) and the operation information are acquired by using, as a reference, a calculation interval of the biological information (41).

With the above configuration, the environment information 42 and the operation information 43 are acquired by matching the time-series biological-environment-operation information 47 with the calculation interval of the information (for example, the ANF information 473) calculated from the biological information 41, so that the time-series biological-environment-operation information 47 is information with a uniform granularity in time series. As a result, it is possible to improve the calculation accuracy of the accident risk prediction model 48 and the accident risk factor calculation model 49 using the time-series biological-environment-operation information 47.

The present invention is not limited to the above embodiment, and various modification examples may be provided. For example, the above embodiments are described in detail in order to explain the present invention in an easy-to-understand manner, and the above embodiments are not necessarily limited to a case including all the described configurations. Further, some components in one embodiment can be replaced with the components in another embodiment, and the configuration of another embodiment can be added to the configuration of one embodiment. Further, for some of the components in the embodiments, any of addition, deletion, or replacement of other components can be applied singly or in combination.

Some or all of the configurations, functions, functional units, processing means, and the like may be realized in hardware by being designed with an integrated circuit, for example. Further, the above-described respective components, functions, and the like may be realized by software by the processor interpreting and executing a program for realizing the respective functions. Information such as a program, a table, and a file, that realizes each function can be stored in a memory, a recording device such as a hard disk and a solid state drive (SSD), or a recording medium such as an IC card, an SD card, and a DVD.

Control lines and information lines considered necessary for the descriptions are illustrated, and not all the control lines and the information lines in the product are necessarily shown. In practice, it may be considered that almost all components are connected to each other.

What is claimed is:

1. A driving assistance method in which a computer including a processor and a memory assists driving of a vehicle, the driving assistance method comprising:
by the computer, acquiring biological information of a driver who is driving the vehicle;
acquiring environment information of the driver;
acquiring operation information of the driver;
generating biological index data from the biological information;
generating integrated information by aligning and combining time series of the biological index data, the environment information, and the operation information;
calculating accident risk information after a predetermined time, by inputting the integrated information to an accident risk prediction model set in advance; and
calculating factor information of the accident risk information by inputting the accident risk information, the integrated information, and accident risk judge information set in advance to a factor calculation model set in advance.

2. The driving assistance method according to claim 1, further comprising outputting, by the computer, the accident risk information and the factor information when the accident risk information satisfies a predetermined condition.

3. The driving assistance method according to claim 2, further comprising updating, by the computer, the factor information with a factor label when the computer receives the factor label for the output factor information.

4. The driving assistance method according to claim 3, further comprising by the computer, reflecting the factor label used to update the factor information to the accident risk judge information, and performing learning of the accident risk prediction model with the accident risk judge information in which the factor label has been reflected.

5. The driving assistance method according to claim 1, wherein in the generating of the integrated information, when the biological information, the environment information, and the operation information are integrated, values of the environment information and the operation information are acquired by using, as a reference, a calculation interval of the biological information.

6. A driving assistance system that assists driving of a vehicle, the driving assistance system comprising:
a server that includes a processor and a memory;
a biological information collection device that is connected to the server and acquires biological information of a driver;
an environment information collection device that is connected to the server and acquires environment information of the driver;
an operation information collection device that is connected to the server and acquires operation information of the driver; and
a terminal that is connected to the server and outputs a message,
wherein
the server includes
an integrated information generation unit that
acquires the biological information of the driver who is driving the vehicle from the biological information collection device,
acquires the environment information of the driver from the environment information collection device,
acquires the operation information of the driver from the operation information collection device,
generates biological index data from the biological information, and
generates integrated information by aligning and combining time series of the biological index data, the environment information, and the operation information,
an accident risk prediction unit that calculates accident risk information after a predetermined time, by inputting the integrated information to an accident risk prediction model set in advance, and
a factor calculation unit that calculates factor information of the accident risk information by inputting the accident risk information, the integrated information, and accident risk judge information set in advance, to a factor calculation model set in advance.

7. The driving assistance system according to claim 6, wherein the server further includes a presentation unit that outputs the accident risk information and the factor information to the terminal when the accident risk information satisfies a predetermined condition.

8. The driving assistance system according to claim 7, wherein the presentation unit updates the factor information with a factor label when receiving the factor label for the output factor information.

9. The driving assistance system according to claim 8, wherein the server further includes a training unit that reflects the factor label used to update the factor information to the accident risk judge information, and performs learning of the accident risk prediction model with the accident risk judge information in which the factor label has been reflected.

10. The driving assistance system according to claim 6, wherein when integrating the biological information, the environment information, and the operation information, the integrated information generation unit acquires values of the environment information and the operation information by using, as a reference, a calculation interval of the biological information.

11. A server that includes a processor and a memory and assists driving of a vehicle, the server comprising:
an integrated information generation unit that
acquires biological information of a driver who is driving the vehicle,
acquires environment information of the driver,
acquires operation information of the driver,
generates biological index data from the biological information, and
generates integrated information by aligning and combining time series of the biological index data, the environment information, and the operation information;
an accident risk prediction unit that calculates accident risk information after a predetermined time, by inputting the integrated information to an accident risk prediction model set in advance; and
a factor calculation unit that calculates factor information of the accident risk information by inputting the accident risk information, the integrated information, and accident risk judge information set in advance, to a factor calculation model set in advance.

12. The server according to claim 11, further comprising a presentation unit that outputs the accident risk information and the factor information when the accident risk information satisfies a predetermined condition.

13. The server according to claim 12, wherein the presentation unit updates the factor information with a factor label when receiving the factor label for the output factor information.

14. The server according to claim 13, further comprising a training unit that reflects the factor label used to update the factor information to the accident risk judge information, and performs learning of the accident risk prediction model with the accident risk judge information in which the factor label has been reflected.

15. The server according to claim 11, wherein when integrating the biological information, the environment information, and the operation information, the integrated information generation unit acquires values of the environment information and the operation information by using, as a reference, a calculation interval of the biological information.

\* \* \* \* \*